(12) United States Patent
Qiu

(10) Patent No.: US 7,107,013 B2
(45) Date of Patent: Sep. 12, 2006

(54) COOPERATIVE LINK CHARACTERIZATION AND MCS SELECTION BY WIRELESS TERMINAL AND NETWORK FOR IMPROVED SYSTEM PERFORMANCE

(75) Inventor: Xiaoxin Qiu, Bridgewater, NJ (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 10/828,043

(22) Filed: Apr. 20, 2004

(65) Prior Publication Data

US 2004/0253927 A1   Dec. 16, 2004

Related U.S. Application Data

(60) Provisional application No. 60/478,922, filed on Jun. 16, 2003.

(51) Int. Cl.
*H04B 17/00* (2006.01)
(52) U.S. Cl. .................. 455/67.13; 455/67.11
(58) Field of Classification Search ............. 455/67.13, 455/67.11, 452.2, 69; 375/264
See application file for complete search history.

(56) References Cited

U.S. PATENT DOCUMENTS

| | | | |
|---|---|---|---|
| 6,208,663 B1 * | 3/2001 | Schramm et al. | 370/465 |
| 6,505,034 B1 * | 1/2003 | Wellig | 455/69 |
| 6,631,127 B1 * | 10/2003 | Ahmed et al. | 370/349 |
| 6,694,135 B1 * | 2/2004 | Oksala et al. | 455/424 |
| 2001/0034209 A1 * | 10/2001 | Tong et al. | 455/69 |
| 2002/0068560 A1 * | 6/2002 | Agin | 455/423 |
| 2004/0014444 A1 * | 1/2004 | Rached et al. | 455/135 |

FOREIGN PATENT DOCUMENTS

| | | | |
|---|---|---|---|
| EP | 1207644 A2 * | 5/2002 | |
| EP | 1255368 A1 * | 11/2002 | |

* cited by examiner

*Primary Examiner*—Matthew D. Anderson
*Assistant Examiner*—Lewis West
(74) *Attorney, Agent, or Firm*—Garlick Harrison & Markison; Robert A. McLauchlan, III

(57) ABSTRACT

RF communications received by a wireless terminal from a servicing base station are used to determine the downlink quality report and implement link adaptation decisions. This involves first implementing an initial transmission scheme between the servicing base station and the wireless terminal. Next, a current downlink quality report corresponding to the initial transmission scheme is generated by the wireless terminal and received at the servicing base station. This downlink quality report is based in whole or in part on a bit-error probability (BEP). The current downlink quality report that corresponds to the initial transmission scheme is then compared to link adaptation thresholds. When the current downlink quality report compares unfavorably to the link adaptation thresholds, an alternative transmission scheme is selected and implemented between the servicing base station and the wireless terminals if the alternative transmission scheme is expected to result in an improved downlink quality report over the current down-link quality report.

26 Claims, 15 Drawing Sheets

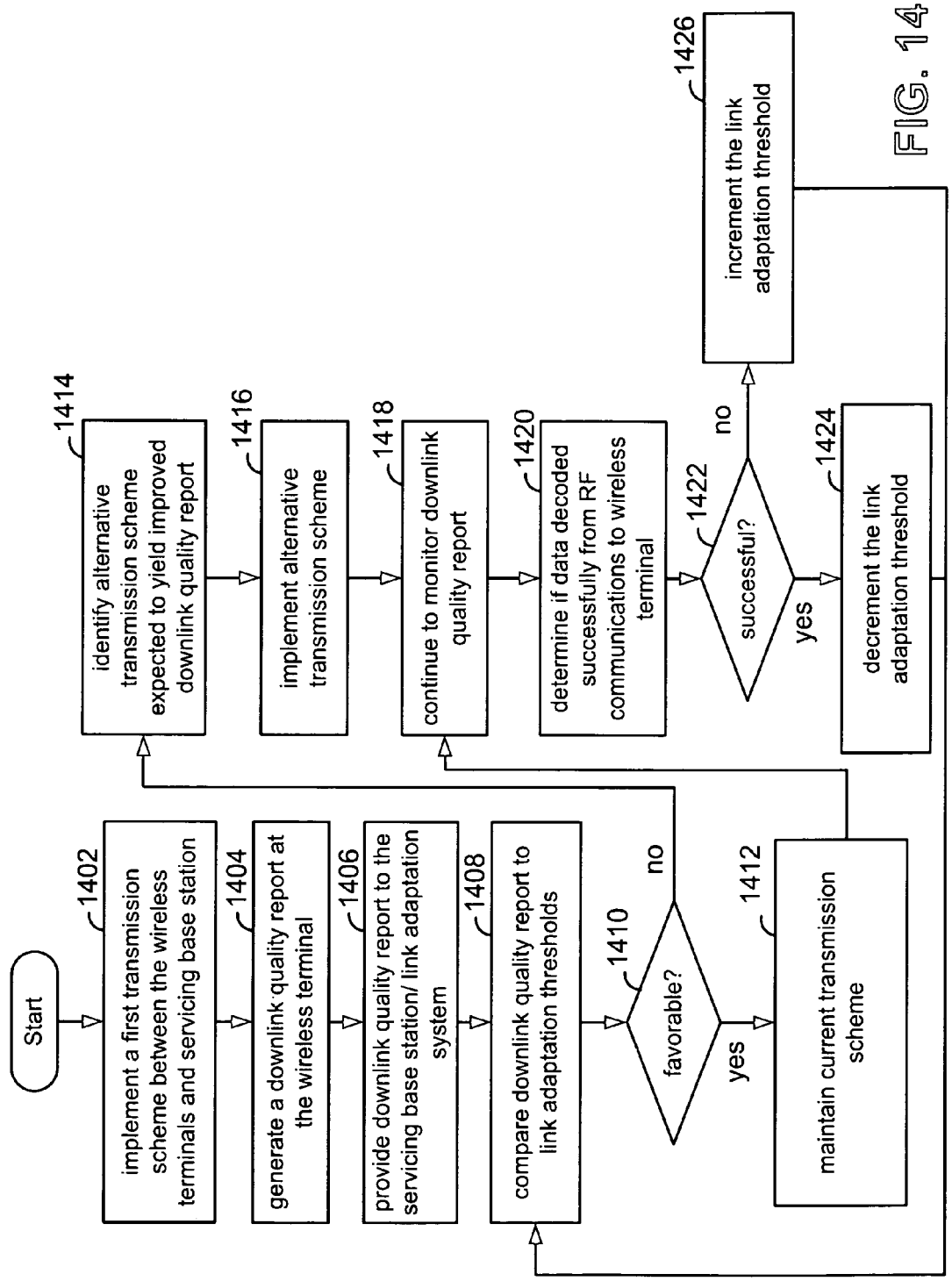

COOPERATIVE LINK CHARACTERIZATION AND MCS SELECTION BY WIRELESS TERMINAL AND NETWORK FOR IMPROVED SYSTEM PERFORMANCE

CROSS REFERENCES TO RELATED APPLICATIONS

This application claims priority to U.S. Provisional Patent Application Ser. No. 60/478,922, filed Jun. 16, 2003, which is incorporated herein by reference for all purposes.

BACKGROUND

1. Technical Field

The present invention relates generally to cellular wireless communication systems, and more particularly to the determination of a bit error probability of radio frequency communications received by a wireless terminal within a cellular wireless communication system.

2. Related Art

Cellular wireless communication systems support wireless communication services in many populated areas of the world. While cellular wireless communication systems were initially constructed to service voice communications, they are now called upon to support data communications as well. The demand for data communication services has exploded with the acceptance and widespread use of the Internet. While data communications have historically been serviced via wired connections, cellular wireless users now demand that their wireless units also support data communications. Many wireless subscribers now expect to be able to "surf" the Internet, access their email, and perform other data communication activities using their cellular phones, wireless personal data assistants, wirelessly linked notebook computers, and/or other wireless devices. The demand for wireless communication system data communications will only increase with time. Thus, cellular wireless communication systems are currently being created/modified to service these burgeoning data communication demands.

Cellular wireless networks include a "network infrastructure" that wirelessly communicates with wireless terminals within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also typically directly or indirectly couples to the Internet.

In operation, each base station communicates with a plurality of wireless terminals operating in its cell/sectors. A BSC coupled to the base station routes voice communications between the MSC and a serving base station. The MSC routes voice communications to another MSC or to the PSTN. Typically, BSCs route data communications between a servicing base station and a packet data network that may include or couple to the Internet. Transmissions from base stations to wireless terminals are referred to as "forward link" transmissions while transmissions from wireless terminals to base stations are referred to as "reverse link" transmissions. The volume of data transmitted on the forward link typically exceeds the volume of data transmitted on the reverse link. Such is the case because data users typically issue commands to request data from data sources, e.g., web servers, and the web servers provide the data to the wireless terminals. The great number of wireless terminals communicating with a single base station forces the need to divide the forward and reverse link transmission times amongst the various wireless terminals.

Wireless links between base stations and their serviced wireless terminals typically operate according to one (or more) of a plurality of operating standards. These operating standards define the manner in which the wireless link may be allocated, setup, serviced and torn down. One popular cellular standard is the Global System for Mobile telecommunications (GSM) standard. The GSM standard, or simply GSM, is predominant in Europe and is in use around the globe. While GSM originally serviced only voice communications, it has been modified to also service data communications. GSM General Packet Radio Service (GPRS) operations and the Enhanced Data rates for GSM (or Global) Evolution (EDGE) operations coexist with GSM by sharing the channel bandwidth, slot structure, and slot timing of the GSM standard. GPRS operations and EDGE operations may also serve as migration paths for other standards as well, e.g., IS-136 and Pacific Digital Cellular (PDC).

The GSM standard specifies communications in a time divided format (in multiple channels). The GSM standard specifies a 4.615 ms frame that includes 8 slots of, each including eight slots of approximately 577 μs in duration. Each slot corresponds to a Radio Frequency (RF) burst. A normal RF burst, used to transmit information, typically includes a left side, a midamble, and a right side. The midamble typically contain a training sequence whose exact configuration depends on modulation format used. However, other types of RF bursts are known to those skilled in the art. Each set of four bursts on the forward link carry a partial link layer data block, a full link layer data block, or multiple link layer data blocks. Also included in these four bursts is control information intended for not only the wireless terminal for which the data block is intended but for other wireless terminals as well.

GPRS and EDGE include multiple coding/puncturing schemes and multiple modulation formats, e.g., Gaussian Minimum Shift Keying (GMSK) modulation or Eight Phase Shift Keying (8PSK) modulation. Particular coding/puncturing schemes and modulation formats used at any time depend upon the quality of a servicing forward link channel, e.g., Signal-to-Noise-Ratio (SNR) or Signal-to-Interference-Ratio (SIR) of the channel, Bit Error Rate of the channel, Block Error Rate of the channel, etc. As multiple modulation formats may be used for any RF burst, wireless communication systems need the ability to determine which coding scheme and modulation format will result in the successful receipt and demodulation of the information contained within the RF burst. This decision may be further influenced by changing radio conditions and the desired quality level to be associated with the communications.

Link adaptation (LA) is a mechanism used to adapt the channel coding schemes and modulation formats to the changing radio link conditions. LA allows the network to command the handset to change to the modulation and coding scheme that is best for the current radio condition while providing a desired level of quality associated with the communications. To facilitate LA, an accurate or representative measure of the changing radio conditions is required. The actual Bit Error Rate (BER) associated with the changing radio conditions would provide such a measure. However, exact BER evaluation is often intractable or numerically cumbersome. Therefore, approximations or probabilities of the BER are sought. Such approximations may be referred to as the Bit Error Probability (BEP).

Methods used to estimate the BEP often rely on additive white-Gaussian noise (AWGN) to compute the signal to noise ratio (SNR) from which the BEP is based. Although this method is easy to apply, using the standard Gaussian approximation often overestimates system performance. Furthermore, such approximations fail to consider whether or not the RF communications were properly decoded. This over estimation of system performance can result in optimistic BEPs being used to make LA decisions. LA decisions based upon optimistic BEP can result in lost communications between the wireless terminal and the servicing base station. Therefore a need exists to implement LA decisions based on more efficiently determined BEPs.

BRIEF SUMMARY OF THE INVENTION

In order to overcome the shortcomings of prior devices, the present invention provides a system and method to determine the bit error probability (BEP) of a received radio frequency (RF) burst within a data frame and use this information to implement LA decisions that substantially addresses the above identified needs.

One embodiment involves first implementing a first transmission scheme between the servicing base station and the reporting wireless terminal. Next, a first downlink quality report corresponding to the first transmission scheme is generated by the wireless terminal and received at the servicing base station. This downlink quality report includes a bit-error probability (BEP) based on a re-encoded bit-error (RBER) of data within the RF burst and an estimated BEP derived from a single-to-noise ratio (SNR) of the RF burst. The downlink quality report also may include a block error rate (BLER). The first downlink quality report that corresponds to the first transmission scheme is then compared to at least one link adaptation threshold. When the first downlink quality report compares unfavorably to the at least one to the link adaptation threshold, an alternative transmission scheme is selected and implemented between the servicing base station and the wireless terminals when the alternative transmission scheme is expected to result in an improved expected quality report over the first down-link quality report. The downlink quality report may further include a mean BEP determined by averaging the BEP of each RF burst within a data frame and the standard deviation of the BEP within the data frame.

A second embodiment includes a cellular wireless communication system having servicing base stations that are operable to select the transmission scheme for RF bursts (communications) between the servicing base stations and wireless terminals. At least a portion of the wireless terminals serviced by the servicing base stations transmits a downlink quality report on the implemented transmission schemes to the servicing base stations. This downlink quality report includes a BEP based on the RBER of data within the RF burst and/or the estimated BEP derived from the SNR of the RF burst. The downlink quality report also may include a block error rate (BLER). A link adaptation system operably coupled to the servicing base station compares the downlink quality report to link adaptation thresholds. Based on this comparison, the link adaptation system implements an alternative transmission scheme between the servicing base station and the wireless terminal when the downlink quality report compares unfavorably to the link adaptation thresholds. Furthermore, this alternative transmission scheme may only be implemented when the alternative transmission scheme is expected to result in an improved downlink quality report over the current downlink quality report. This downlink quality report may further include the mean BEP determined by averaging the BEP of each RF burst within the data frame and the standard deviation of the BEP. To reduce the possibility of spurious changes of the transmission scheme, the link adaptation thresholds may be incremented or decremented when the data within the RF burst decoded unfavorably or favorably, respectively.

Yet another embodiment of the present invention provides a method to dynamically select a transmission scheme for an RF burst between the servicing base stations and reporting wireless terminals within a wireless communication system. A first transmission scheme is implemented between the servicing base station and the reporting wireless terminal. The reporting wireless terminal generates and transmits a first downlink quality report corresponding to that first transmission scheme to the servicing base station. This down-link quality report includes a mean BEP determined by averaging the BEP of each RF burst within the data frame, a standard deviation of the BEP wherein the BEP is based on an estimated BEP derived from the SNR of the RF burst and an RBER. In the determination of the BEP, the estimated BEP is weighed more heavily when the RF burst decodes unfavorably while the RBER is weighed more heavily when the RF burst is decoded favorably. Should the RF burst decode unfavorably, the RBER may correspond to a bit-error-rate exceeding a threshold value. The downlink quality report is compared to link-adaptation thresholds in order to determine when an alternative transmission scheme should be implemented. When the downlink quality report compares unfavorably to the link adaptation thresholds and an alternative transmission scheme is expected to result in an expected downlink quality report being improved over the current downlink quality report the alternative transmission scheme may be implemented.

Other features and advantages of the present invention will become apparent from the following detailed description of the invention made with reference to the accompanying drawings.

BRIEF DESCRIPTION OF THE DRAWINGS

FIG. 14 is a logic diagram illustrating an embodiment of the present invention that implements link adaptation decisions based on a downlink quality report, wherein the link adaptation thresholds are altered depending on the success of decoding the RF communications.

DETAILED DESCRIPTION OF THE DRAWINGS

Figure 1:
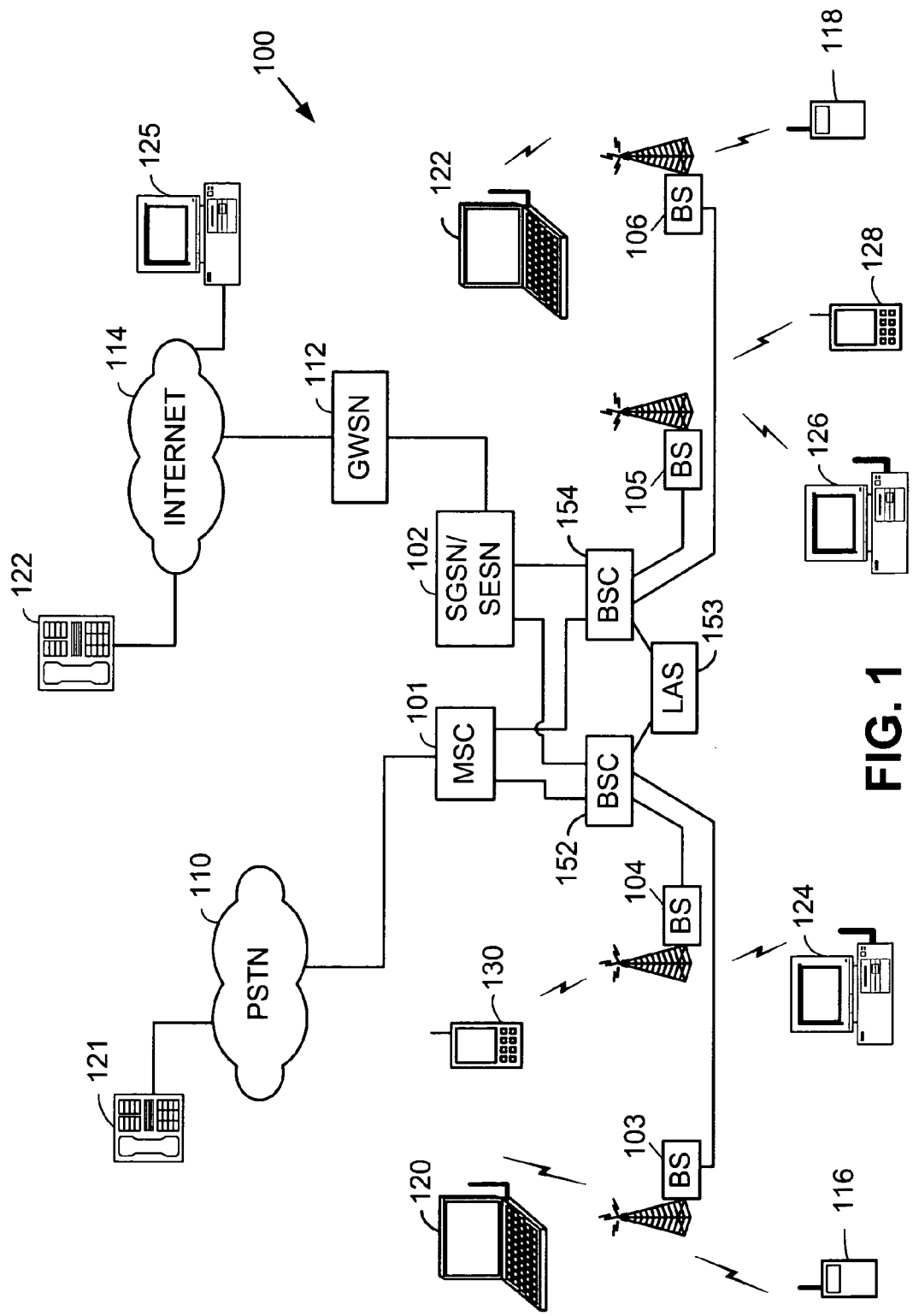
FIG. 1 is a system diagram illustrating a portion of a cellular wireless communication system that supports wireless terminals operating according to the present invention.

FIG. 1 is a system diagram illustrating a portion of a cellular wireless communication system 100 that supports wireless terminals operating according to the present invention. The cellular wireless communication system 100 includes a Mobile Switching Center (MSC) 101, Serving GPRS Support Node/Serving EDGE Support Node (SGSN/SESN) 102, base station controllers (BSCs) 152 and 154, link adaptation systems (LAS) 153, and base stations 103, 104, 105, and 106. The SGSN/SESN 102 couples to the Internet 114 via a GPRS Gateway Support Node (GGSN) 112. A conventional voice terminal 121 couples to the PSTN 110. A Voice over Internet Protocol (VoIP) terminal 123 and a personal computer 125 couple to the Internet 114. The MSC 101 couples to the Public Switched Telephone Network (PSTN) 110.

Each of the base stations 103–106 services a cell/set of sectors within which it supports wireless communications. Wireless links that include both forward link components and reverse link components support wireless communications between the base stations and their serviced wireless terminals. These wireless links support digital data communications, VoIP communications, and other digital multimedia communications. The cellular wireless communication system 100 may also be backward compatible in supporting analog operations as well. The cellular wireless communication system 100 supports the Global System for Mobile telecommunications (GSM) standard and also the Enhanced Data rates for GSM (or Global) Evolution (EDGE) extension thereof. The cellular wireless communication system 100 may also support the GSM General Packet Radio Service (GPRS) extension to GSM. However, the present invention is also applicable to other standards as well, e.g., TDMA standards, CDMA standards, etc. In general, the teachings of the present invention apply to digital communications that apply dynamic link adaptation (LA) of the Modulation and Coding schemes (MCSs) utilized for communications between wireless terminals and servicing base stations.

Wireless terminals 116, 118, 120, 122, 124, 126, 128, and 130 couple to the cellular wireless communication system 100 via wireless links with the base stations 103-106. As illustrated, wireless terminals may include cellular telephones 116 and 118, laptop computers 120 and 122, desktop computers 124 and 126, and data terminals 128 and 130. However, the wireless system supports communications with other types of wireless terminals as known to those skilled in the art as well. As is generally known, devices such as laptop computers 120 and 122, desktop computers 124 and 126, data terminals 128 and 130, and cellular telephones 116 and 118, are enabled to "surf" the Internet 114, transmit and receive data communications such as email, transmit and receive files, and to perform other data operations. Many of these data operations have significant download data-rate (forward link) requirements while the upload data-rate (reverse link) requirements are not as severe. Some or all of the wireless terminals 116–130 are therefore enabled to support the EDGE operating standard. These wireless terminals 116–130 also support the GSM standard and may support the GPRS standard. Wireless terminals 116–130 support the LA decision making process by determining the bit error probability (BEP) of received radio frequency (RF) communications received from by base stations 103–106 and reporting this BEP to the wireless communication system 100. Link adaptation systems (LAS) 153, shown operable coupled to BSC 152 and 154, use provided BEP and BLER information contained within a downlink quality report to select an appropriate MCS (transmission scheme). In many cases, the BLER provides more objective data when compared to that of the BEP. The BLER is an important indicator of link quality because the BLER may comprise or be derived from a bitmap that indicates which segments of the RF transmissions were requested to be retransmitted. Although LAS is shown operable coupled to the BSCs, the LAS may be operable coupled to BSs 103–106.

Wireless terminals 116–130 support the pipelined processing of received RF bursts in slots of a GSM frame so that a plurality of slots in each sub-frame of a GSM frame are allocated for forward link transmissions to a single wireless terminal. In one embodiment, a number of slots of a GSM frame are allocated for forward link transmissions to a wireless terminal such that the wireless terminal must receive and process a number of RF bursts, e.g., 2, 3, 4, or more RF bursts, in each GSM frame. The wireless terminal is able to process the RF bursts contained in these slots and still service reverse link transmissions and the other processing requirements of the wireless terminal.

Figure 2:
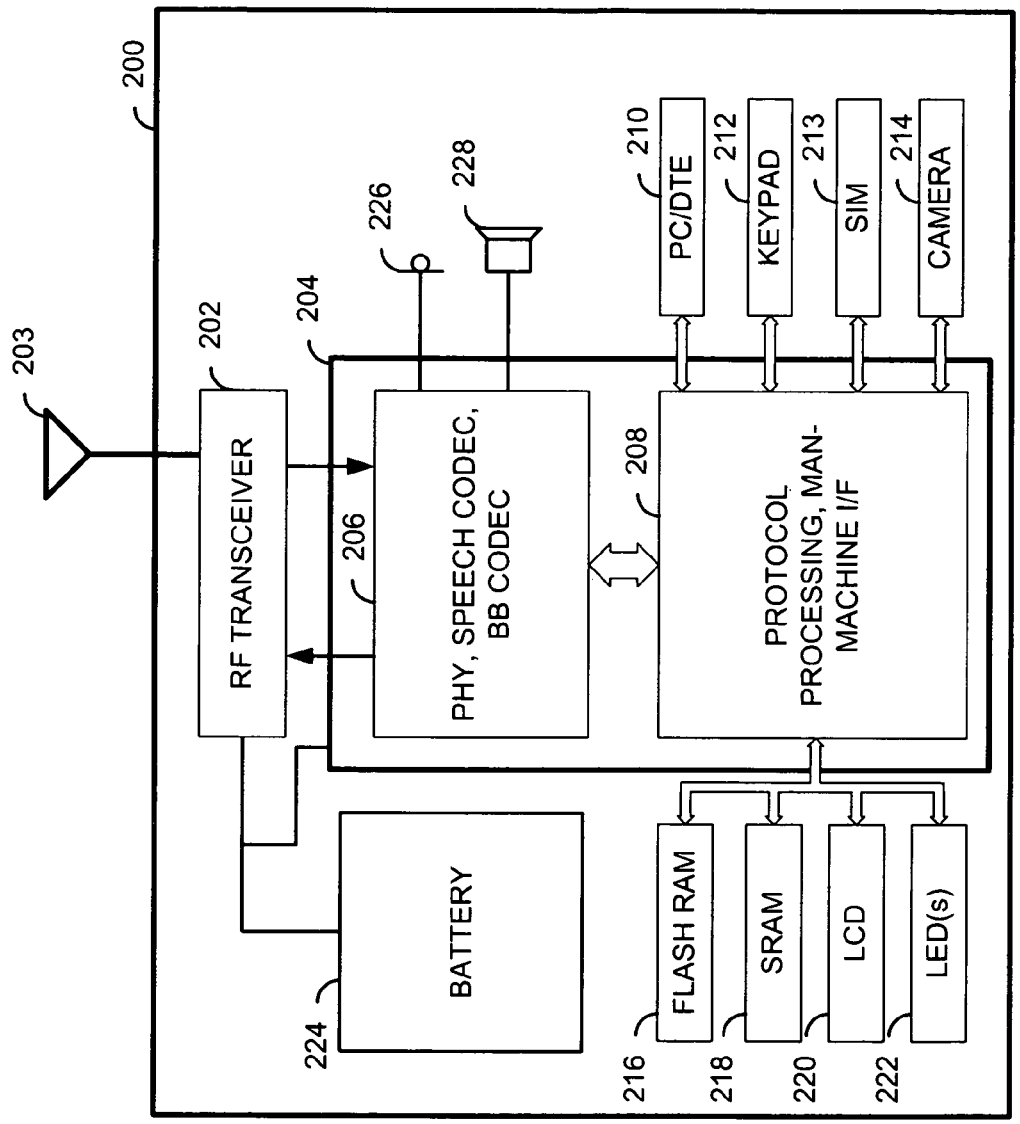
FIG. 2 is a block diagram functionally illustrating a wireless terminal constructed according to the present invention.

FIG. 2 is a block diagram functionally illustrating a wireless terminal 200 constructed according to the present invention. The wireless terminal 200 of FIG. 2 includes an RF transceiver 202, digital processing components 204, and various other components contained within a housing. The digital processing components 204 includes two main functional components, a physical layer processing, speech COder/DECoder (CODEC), and baseband CODEC functional block 206 and a protocol processing, man-machine interface functional block 208. A Digital Signal Processor (DSP) is the major component of the physical layer processing, speech COder/DECoder (CODEC), and baseband CODEC functional block 206 while a microprocessor, e.g., Reduced Instruction Set Computing (RISC) processor, is the major component of the protocol processing, man-machine interface functional block 208. The DSP may also be referred to as a Radio Interface Processor (RIP) while the RISC processor may be referred to as a system processor. However, these naming conventions are not to be taken as limiting the functions of these components.

The RF transceiver 202 couples to an antenna 203, to the digital processing components 204, and also to a battery 224 that powers all components of the wireless terminal 200. The physical layer processing, speech COder/DECoder (CODEC), and baseband CODEC functional block 206 couples to the protocol processing, man-machine interface functional block 208 and to a coupled microphone 226 and speaker 228. The protocol processing, man-machine interface functional block 208 couples to a Personal Computing/Data Terminal Equipment interface 210, a keypad 212, a Subscriber Identification Module (SIM) port 213, a camera 214, a flash RAM 216, an SRAM 218, a LCD 220, and LED(s) 222. The camera 214 and LCD 220 may support either/both still pictures and moving pictures. Thus, the wireless terminal 200 of FIG. 2 supports video services as well as audio services via the cellular network.

Figure 3:
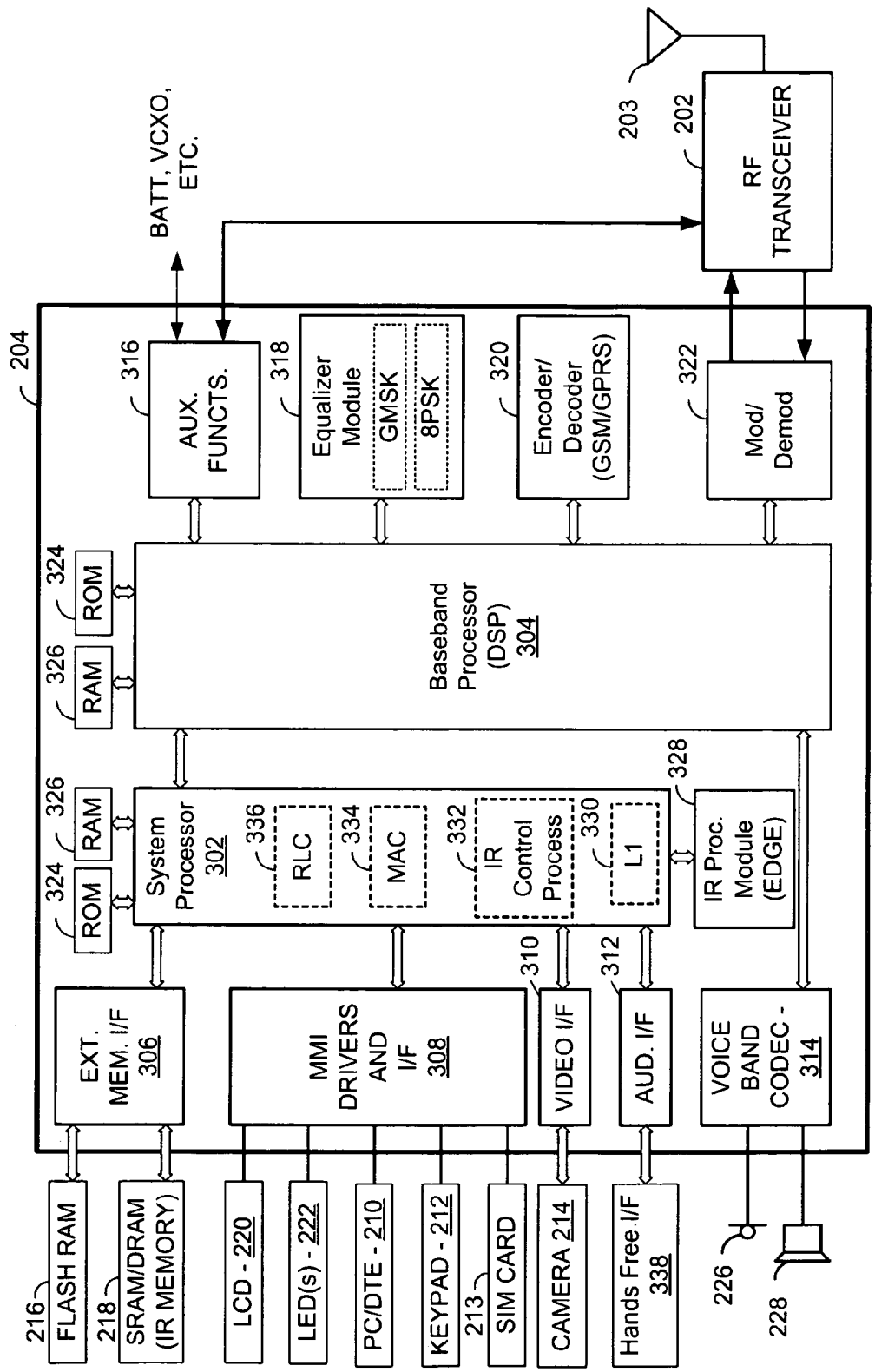
FIG. 3 is a block diagram illustrating in more detail the wireless terminal of FIG. 2, with particular emphasis on the digital processing components of the wireless terminal.

FIG. 3 is a block diagram illustrating in more detail the wireless terminal of FIG. 2, with particular emphasis on the digital processing components of the wireless terminal. The digital processing components 204 include a system processor 302, a baseband processor 304, and a plurality of supporting components. The supporting components include an external memory interface 306, MMI drivers and I/F 308, a video I/F 310, an audio I/F 312, a voice band CODEC 314, auxiliary functions 316, a modulator/demodulator 322, ROM 324, RAM 326 and a plurality of processing modules. In some embodiments, the modulator/demodulator 322 is not a separate structural component with these functions being performed internal to the baseband processor 304.

The processing modules are also referred to herein as accelerators, co-processors, processing modules, or otherwise, and include auxiliary functions 316, an equalizer module 318, an enCOder/DECoder (CODEC) processing module 320, and an Incremental Redundancy (IR) processing module 328. The interconnections of FIG. 3 are one example of a manner in which these components may be interconnected. Other embodiments support additional/alternate couplings. Such coupling may be direct, indirect, and/or may be via one or more intermediary components.

RAM and ROM service both the system processor 302 and the baseband processor 304. Both the system processor 302 and the baseband processor 304 may couple to shared RAM 326 and ROM 324, couple to separate RAM, coupled to separate ROM, couple to multiple RAM blocks, some shared, some not shared, or may be served in a differing manner by the memory. In one particular embodiment, the system processor 302 and the baseband processor 304 coupled to respective separate RAMs and ROMs and also couple to a shared RAM that services control and data transfers between the devices. The processing modules 316, 318, 320, 322, and 328 may coupled as illustrated in FIG. 3 but may also coupled in other manners in differing embodiments.

The system processor 302 services at least a portion of a serviced protocol stack, e.g., GSM/GPRS/EDGE protocol stack. In particular the system processor 302 services Layer 1 (L1) operations 330, a portion of Incremental Redundancy (IR) GSM protocol stack operations 332 (referred to as "IR control process"), Medium Access Control (MAC) operations 334, and Radio Link Control (RLC) operations 336. The baseband processor 304 in combination with the modulator/demodulator 322, RF transceiver, equalizer module 318, and/or encoder/decoder module 320 service the Physical Layer (PHY) operations performed by the digital processing components 204. The baseband processor 304 may also services a portion of the GSM/GPRS/EDGE protocol stack.

Still referring to FIG. 3, the baseband processor 304 controls the interaction of the baseband processor 304 and equalizer module 318. As will be described further with reference to FIGS. 5–6B, the baseband processor 304 is responsible for causing the equalizer module 318 and the CODEC processing module 320 to process received RF bursts that reside within slots of a GSM frame. In the particular embodiment of FIGS. 2 and 3, with single RF front end 202, wireless terminal 200 may receive and process RF bursts in up to four slots of each GSM frame, i.e., be assigned four slots for forward link transmissions in any particular GSM frame. In another embodiment in which the wireless terminal 200 includes more than one RF front end, the wireless terminal 200 may be assigned more than four slots in each sub-frame of the GSM frame. In this case, required transmit operations would be performed using a second RF front end while a first RF front end would perform the receive operations. When the forward link transmissions and the reverse link transmissions occupy different channels with sufficient frequency separation, and the wireless terminal otherwise supports full duplex operations, the wireless terminal could receive and transmit at the same time.

The combination of the RF front end 202, and base band processor 204, which may include an optional CODEC processing module, receive RF communications from the servicing base station. In one embodiment the RF front end 202 and base band processor 204 receive and process RF bursts from servicing base stations. The combination of RF front end 202 and base band processor 204 are operable to receive RF bursts transmitted according to a transmission scheme wherein the transmission scheme includes both a modulation format and a coding format. Base band processor 204 to produce a data block decodes sequences of soft decisions, extracted from the RF bursts. The sequence of soft decisions may decode successfully into the data block as indicated by error correction coding results. These soft decisions may be protected by cyclical redundant coding (CRC) such as fire coding and convolutional coding. The combination determines whether the decoding of the data block was successful and uses this information to help determined the reported BEP for the data block. When the decoding is unsuccessful the reported BEP is set to the measured BEP plus an increment step size or should the decoding be successful, the reported BEP is set to the measured BEP minus a decrement step size. The reported BEP may be set to a BEP threshold when the decoding is unsuccessful and the BEP threshold exceeds the measured BEP.

Re-encoding of properly decoded data blocks produces a sequence of re-encoded decisions which when compared to the sequence of soft decisions produces a Re-encoded Bit Error (RBER). The BEP reported to the servicing base station is based upon the estimated BEP derived from the SNR and the RBER. When the decoding is unsuccessful, the BEP may be based upon more heavily or solely the estimated BEP provided by the SNR. Similarly, when the decoding is successful, the BEP may be based upon more heavily or solely the RBER or BLER. The BLER is often considered as giving a more objective quality measurement than the BEP or RBER. This allows the BEP to more accurately reflect actual channel conditions. Thus, LA decisions can more effectively select an appropriate MCS based upon existing channel conditions.

Figure 4:
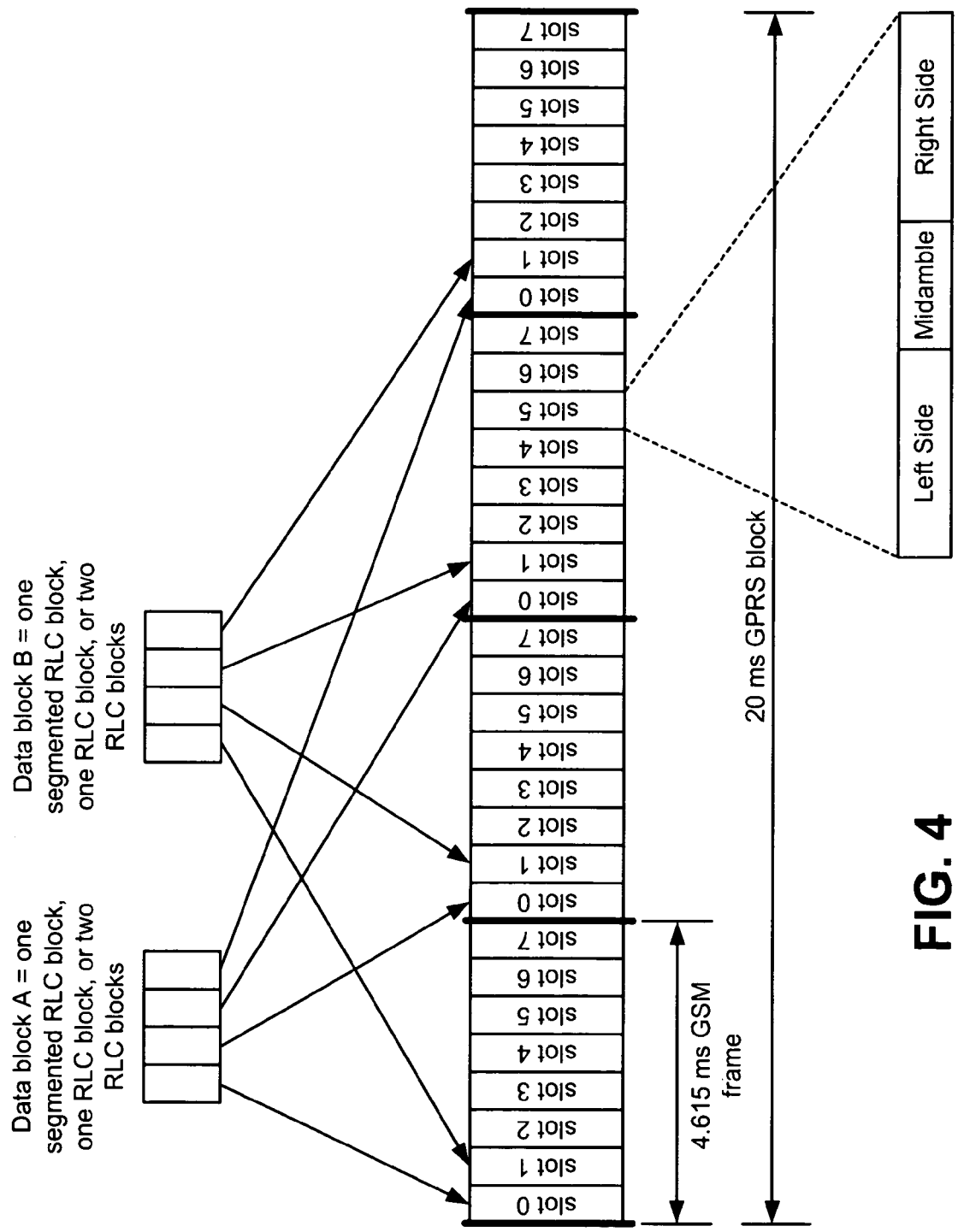
FIG. 4 is a block diagram illustrating the general structure of a GSM frame and the manner in which data blocks are carried by the GSM frame.

FIG. 4 is a block diagram illustrating the general structure of a GSM frame and the manner in which data blocks are carried by the GSM frame. The GSM frame is 4.615 ms in duration, including guard periods, and each of which includes eight slots, slots 0 through 7. Each slot is approximately 577 µs in duration, includes a left side, a midamble, and a right side. The left side and right side of a normal RF burst of the time slot carry data while the midamble is a training sequence.

The RF bursts of four time slots of the GPRS block carry a segmented RLC block, a complete RLC block, or two RLC blocks, depending upon a supported Modulation and Coding Scheme (MCS) mode. For example, data block A is carried in slot 0 of sub-frame 1, slot 0 of sub-frame 2, slot 0 of sub-frame 3, and slot 0 of sub-frame 3. Data block A may carry a segmented RLC block, an RLC block, or two RLC blocks. Likewise, data block B is carried in slot 1 of sub-frame 1, slot 1 of sub-frame 2, slot 1 of sub-frame 3, and slot 1 of sub-frame 3. The MCS mode or CS mode of each set of slots, i.e., slot n of each sub-frame, for the GSM frame is consistent for the GSM frame. Further, the MCS mode or CS mode of differing sets of slots of the GSM frame, e.g., slot 0 of each sub-frame vs. any of slots 1–7 of each sub-frame, may differ. This ability allows LA to be implemented. As will be described further with reference to FIG. 5, the wireless terminal 200 may be assigned multiple slots for forward link transmissions that must be received and processed by the wireless terminal 200.

Figure 5:
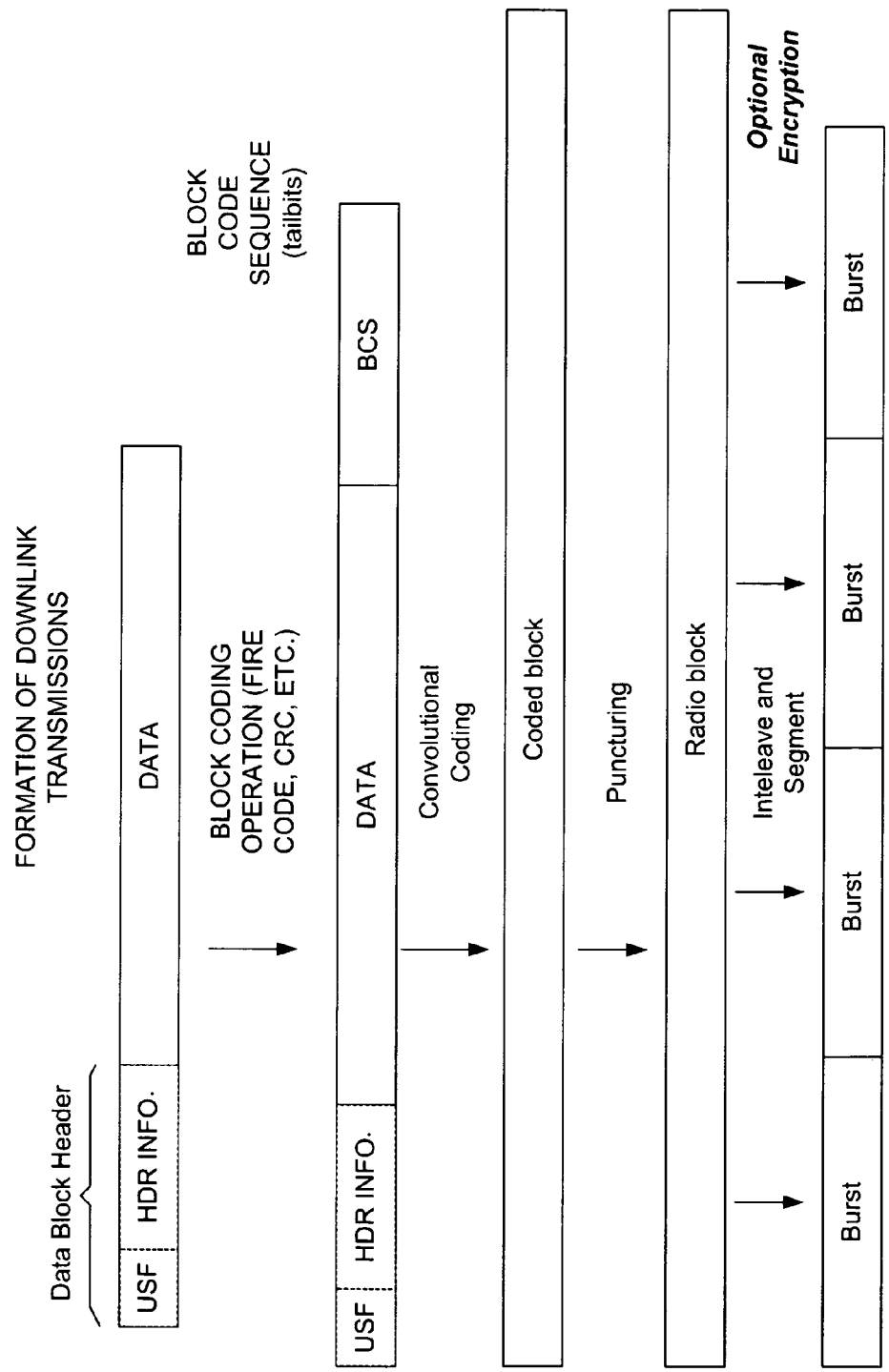
FIG. 5 is a block diagram illustrating the formation of down link transmissions.

FIG. 5 depicts the various stages associated with mapping data into RF bursts. A Data Block Header and Data are initially unencoded. The block coding operations perform the outer coding for the data block and support error detection/correction for data block. The outer coding operations typically employ a cyclic redundancy check (CRC) or a Fire Code. The outer coding operations are illustrated to add tail bits and/or a Block Code Sequence (BCS), which is/are appended to the Data. After block coding has supplemented the Data with redundancy bits for error detection, calculation of additional redundancy for error correction to correct the transmissions caused by the radio channels. The internal error correction or coding scheme of GSM is based on convolutional codes.

Some redundant bits generated by the convolutional encoder are punctured prior to transmission. Puncturing increases the rate of the convolutional code and reduces the redundancy per data block transmitted. Puncturing additionally lowers the bandwidth requirements such that the convolutional encoded signal fits into the available channel bit stream. The convolutional encoded punctured bits are passed to an interleaver, which shuffles various bit streams and segments the interleaved bit streams into the 4 bursts shown.

Each RF burst has a left side, a midamble, and a right side. The left side and right side contain data. The midamble consists of predefined, known bit patterns, the training sequences, which are used for channel estimation to optimize reception with an equalizer and for synchronization. With the help of these training sequences, the equalizer eliminates or reduces the intersymbol interferences, which can be caused by propagation time differences of multipath propagation. A number of training sequences are defined for normal RF bursts in the GSM standard. However, the exact configuration of the training sequences may depend on the modulation format used. Each set of four bursts typically utilizes the same modulation format. By analyzing the training sequence one can determine the modulation format.

Figure 6:
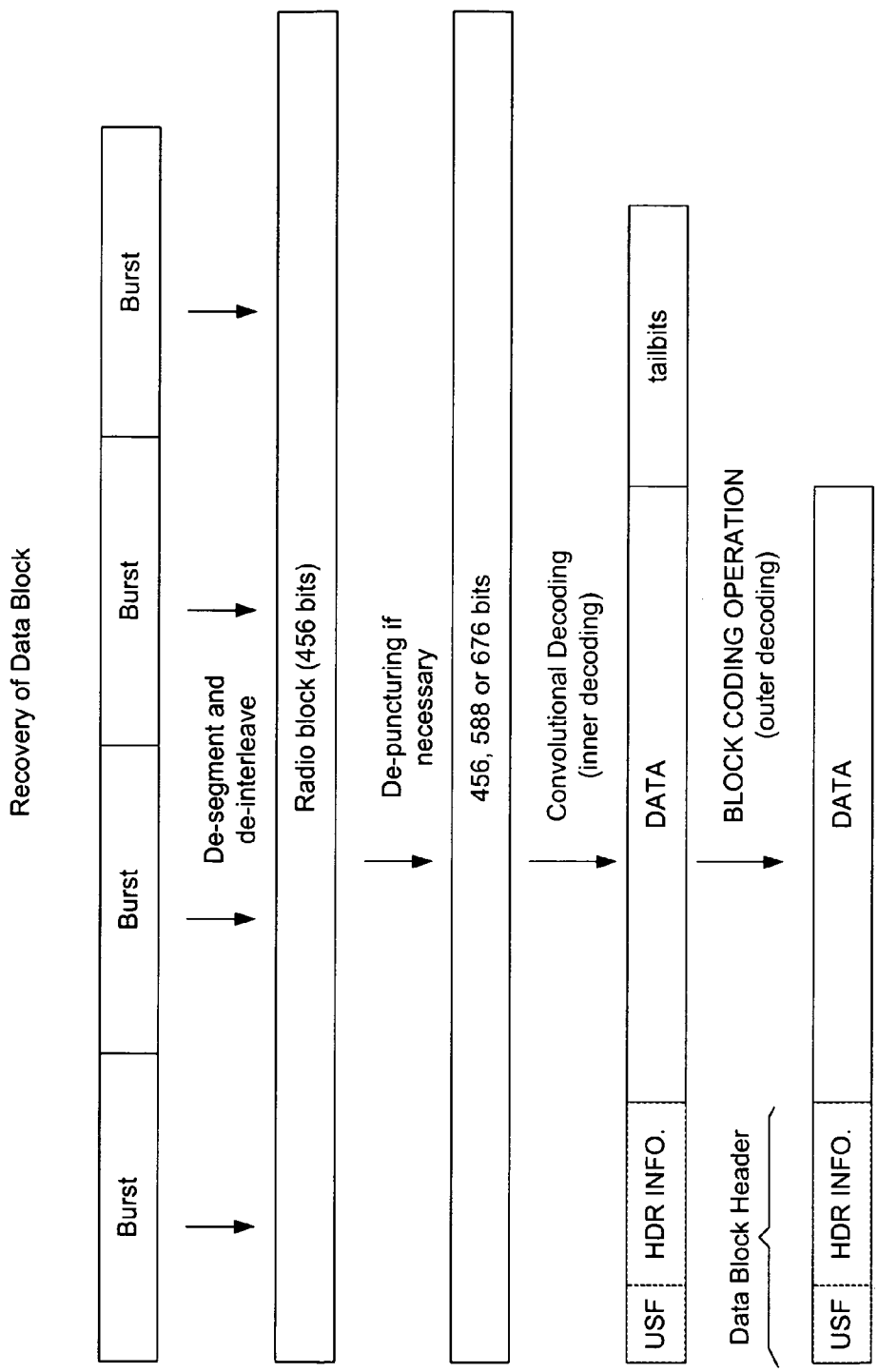
FIG. 6 is a block diagram illustrating the recovery of a data block from a down link transmissions.

FIG. 6 is a block diagram depicting the various stages associated with recovering a data block from RF bursts. Four RF bursts making up a data block are received and processed. Once all four RF bursts have been received, the RF bursts are combined to form an encoded data block. However, in some instances the encoded data block may be recovered from fewer than all four RF bursts. This ability depends upon the robustness of the modulation format and coding scheme. The encoded data block is then depunctured (if required), decoded according to an inner decoding scheme, and then decoded according to an outer decoding scheme. The decoded data block includes the data block header and the data. Successful decoding may be signaled by appropriate tailbits appended to the data following convolutional decoding (error correction coding).

Figure 7:
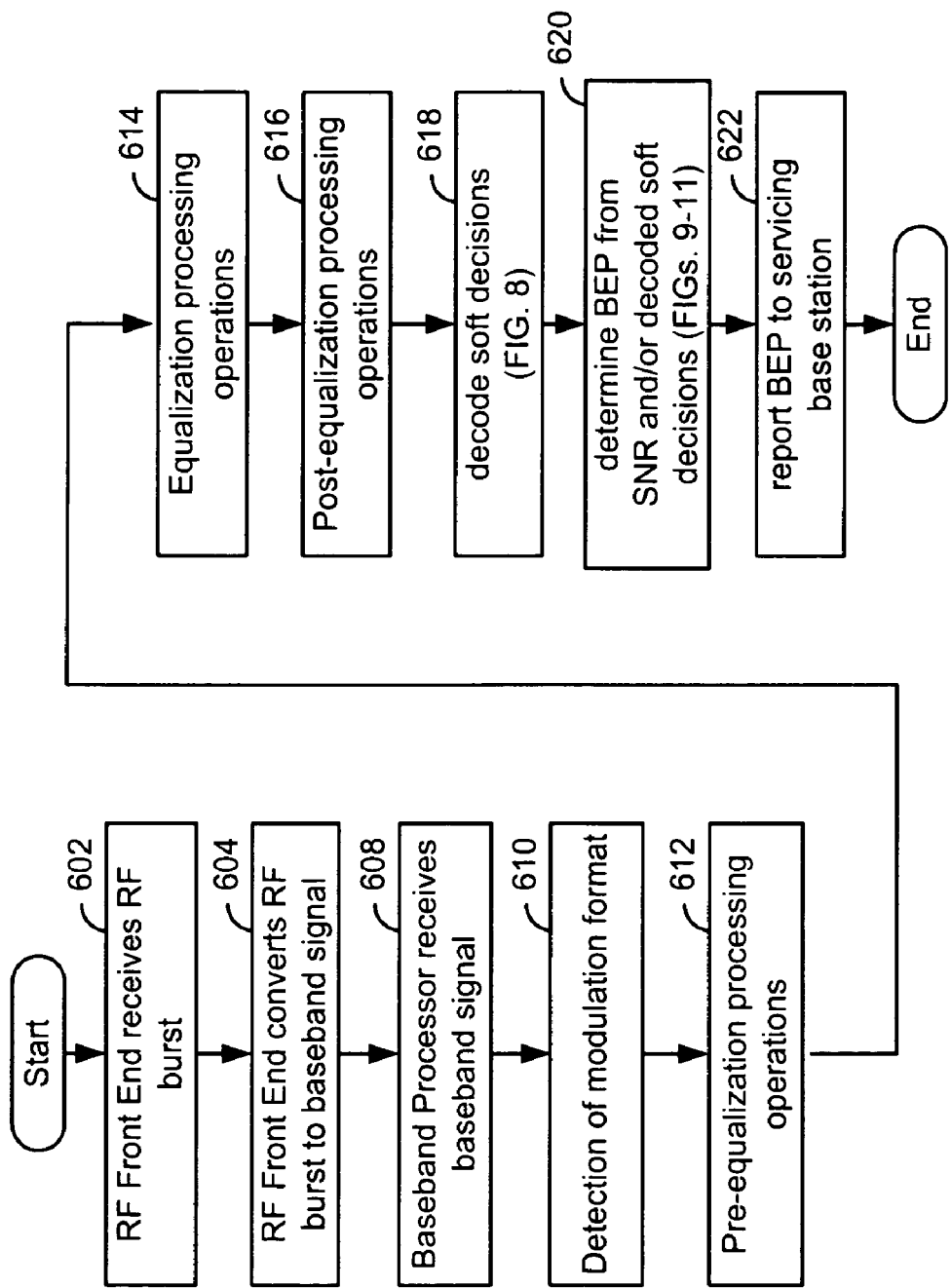
FIG. 7 is a flow chart illustrating operation of a wireless terminal in receiving and processing a RF burst.

FIG. 7 is a flow charts illustrating operation of a wireless terminal 200 in receiving and processing RF bursts. The operations illustrated correspond to a single RF burst in a corresponding slot of GSM frame. The RF front end 202, the baseband processor 304, and the equalizer module 318 illustrated in FIG. 3 perform these operations. These operations are generally called out as being performed by one of these components. However, the split of processing duties among these various components may differ without departing from the scope of the present invention.

A single processing device or a plurality of processing devices operably coupled to memory performs the processing duties. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing duties are implemented via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The processing duties include the execution of operational instructions corresponding to at least some of the steps and/or functions illustrated in FIGS. 6–10.

Referring particularly to FIG. 7, operation commences with the RF front end 202 receiving an RF burst in a corresponding slot of a GSM frame (step 602). The RF front end 202 then converts the RF burst to a baseband signal (step 604). Upon completion of the conversion, the RF front end 202 stores the converted baseband signal. When needed the baseband processor samples the converted baseband signal from the RF front end. Thus, as referred to in FIG. 7, the RF front end 202 performs steps 602–604.

Operation continues with the baseband processor 304 receiving the baseband signal (step 608). In a typical operation, the RF front end 202, the baseband processor 304, or modulator/demodulator 322 samples the analog baseband signal to digitize the baseband signal. After receipt of the baseband signal (in a digitized format), the baseband processor 304 performs blind detection of a modulation format of the baseband signal (step 610). This blind detection of the modulation format determines the modulation format of the corresponding baseband signal. Proper determination of the modulation format is necessary in order to properly determine the SNR of the channel and RBER associated with the data contained within the RF bursts. In one particular embodiment according to the GSM standard, the modulation format will be either Gaussian Minimum Shift Keying (GMSK) modulation or Eight Phase Shift Keying (8PSK) modulation. The baseband processor 304 makes the determination (step 612) and appropriately processes the RF bursts based upon the detected modulation format.

The baseband processor performs pre-equalization processing of the RF bursts in step 612. For GMSK modulation, this processing involves de-rotation and frequency correction; burst power estimation; timing, channel, noise, and signal-to-noise ratio (SNR) estimation; automatic gain control (AGC) loop calculations; soft decision scaling factor determination; and matched filtering operations on the baseband signal. For 8PSK modulation, pre-equalization processing of the RF bursts involves de-rotation and frequency correction; burst power estimation; timing, channel, noise, and SNR estimations; AGC loop calculations; Decision Feedback Equalizer (DFE) coefficients calculations; and soft decision scaling factors for the baseband signal. The SNR estimation from the pre-equalization processing operations may be used later to determine the estimated BEP. Determination of the estimated BEP will be discussed further in FIGS. 9–11. These pre-equalization processing operations produce a processed baseband signal. Upon completion of these pre-equalization processing operations, the baseband processor 304 issues a command to the equalizer module 318.

The equalizer module 318, upon receiving the command, prepares to equalize the processed baseband signal based upon the modulation format, e.g., GMSK modulation or 8PSK modulation in step 614. The equalizer module 318 receives the processed baseband signal, settings, and/or parameters from the baseband processor 304 and equalizes the processed baseband signal. For GMSK, equalization-processing operations involve Maximum Likelihood Sequence Estimation (MLSE) equalization on the left side and right side of the baseband signal to produce soft decisions for the left side and right side. As was shown previously with reference to FIG. 4, each RF burst contains a left side of data, a midamble, and a right side of data. The midamble includes predefined training sequence that may be based on the modulation format. For 8PSK, the equalizer module 318 first prepares state values that it will use in equalizing the 8PSK modulated processed baseband signal. Then equalizer module 318 uses a Maximum A posteriori Probability (MAP) equalizer to equalize the left and right sides of the processed baseband signal to produce soft decisions for the processed baseband signal.

After equalization, the equalizer module 318 then issues an interrupt to the baseband processor 304 indicating that the equalizer operations are complete for the RF bursts. The baseband processor 304 then receives the soft decisions from the equalizer module 318. Next, the baseband processor 304 performs "post-equalization processing" as shown in step 616. This may involve determining an average phase of the left and right sides based upon the soft decisions received from the equalizer module 318 and frequency estimation and tracking based upon the soft decisions received from the equalizer module 318.

The sequences of soft decisions are decoded in step 618. One particular method of decoding the soft decisions is further detailed in FIG. 8. The decoded soft decisions may be used to produce a RBER. This process of producing an RBER will be described in further detail in association with the description of FIGS. 9–11 and following. With the estimated BEP and/or RBER, baseband processor 304 or system processor 302 produce a BEP, which is reported to the servicing base station. While the operations of FIG. 7 are indicated to be performed by particular components of the wireless terminal, such segmentation of operations could be performed by differing components. For example, the baseband processor 304 or system processor 302 in other embodiments could perform the equalization operations. Further, the baseband processor 304 or the system processor 302 in other embodiments could also perform decoding operations.

Figure 8:
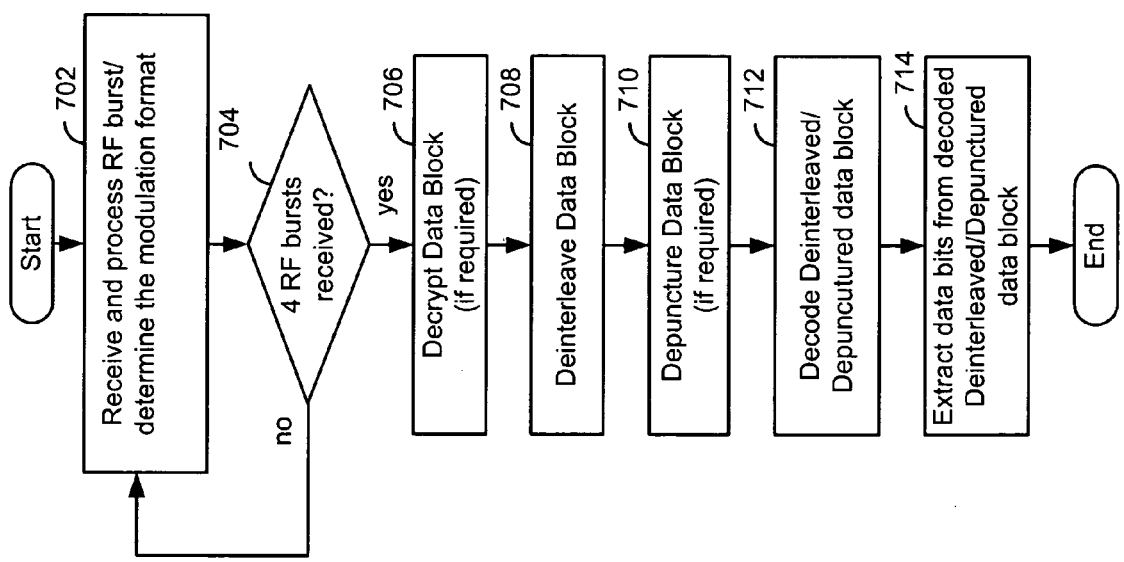
FIG. 8 is a flow chart illustrating operations to recover a data block according to an embodiment of the present invention.

FIG. 8 is a flow chart illustrating operations to decode a data block according to an embodiment of the present invention. Operations commence with receiving and processing an RF burst in step 702 and as described with reference to FIG. 7. After receiving the four RF bursts that complete an EDGE or GPRS data block, as determined at step 704, operation proceeds to step 706.

A header of the data block identifies the coding scheme and puncturing pattern of the data block. For example, the coding scheme may be any one of the MCS-1 through MCS-9 coding schemes, each of which may include multiple puncturing patterns. Operation according to the present invention uses the training sequence of each RF burst, located within the midamble of the RF burst, to identify the modulation format of the RF bursts.

Data recovery begins in step 706 where, if necessary, the data block is decrypted. The data block is then de-interleaved (step 708) according to a particular format of the data block, e.g. MCS-1 through MCS-9. The data block is then de-punctured (step 710). At step 712, the de-interleaved and de-punctured data block is decoded. Decoding operations may include combining previously received copies of the data block with the current copy of the data block. Data bits of the decoded data block are then extracted and processed further (step 714). Properly decoded data blocks can be re-encoded to produce a sequence of re-encoded decisions that when compared to the sequence of soft decisions result in the RBER. The RBER may provide a more accurate indication of the performance of the selected MCS than that provided by the estimated BEP, which is based on the SNR.

Figure 9A:
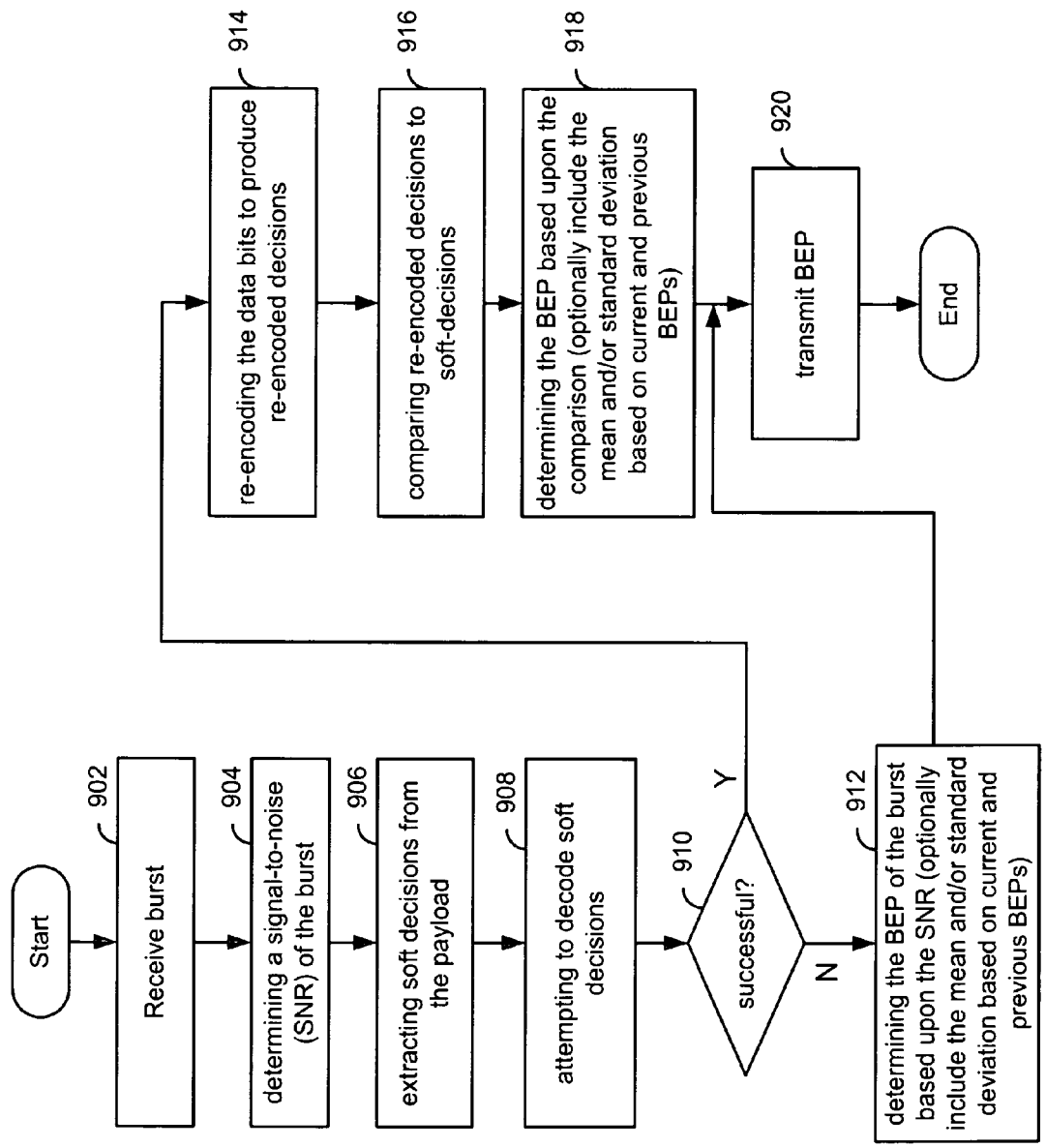
FIGS. 9A and 9B are logic diagrams illustrating methods for operating a wireless terminal to determine a BEP of a received burst according to the present invention.

FIG. 9A is a logic diagram illustrating a method for operating a wireless terminal to determine a BEP of a received bursts according to the present invention. The method commences with receiving the RF bursts in step 902. Next, the signal-to-noise (SNR) of the RF bursts is determined in step 904. The determination of the SNR in step 904 is typically completed as part of the pre-equalization processing of step 612. One embodiments utilizes the extracted training sequences of the RF bursts to produce the SNR and map to an estimated BEP based on the MCS. Continuing with step 906, a sequence of soft decisions is extracted from the payload. This sequence may correspond to the training sequence or data, wherein the greater number of samples available within the data portion would yield more accurate results than those derived from the smaller sample set of the training sequence. An attempt to decode the sequence of soft decisions is made in step 908. When the attempt to decode the plurality of soft decisions is unsuccessful (as determined at decision point 910), the BEP of the RF bursts is determined based upon the SNR (estimated BEP) in step 912. When the sequence of soft decisions decodes successful at decision point 910, the data bits are re-encoded to produce a sequence re-encoded decisions at step 914. Then, the sequence of re-encoded decisions is compared to the sequence of soft-decisions in step 916. This comparison results in a RBER upon which the BEP may be based (step 918). The BEP may be transmitted to a servicing base station in step 920. This process may also include the historical performance of the BEP in determining the BEP reported to the servicing base station by including the mean and/or standard deviation in the determination of the BEP. This reported BEP may be included in a downlink quality level reported by the wireless terminal to the servicing base station.

Figure 9B:
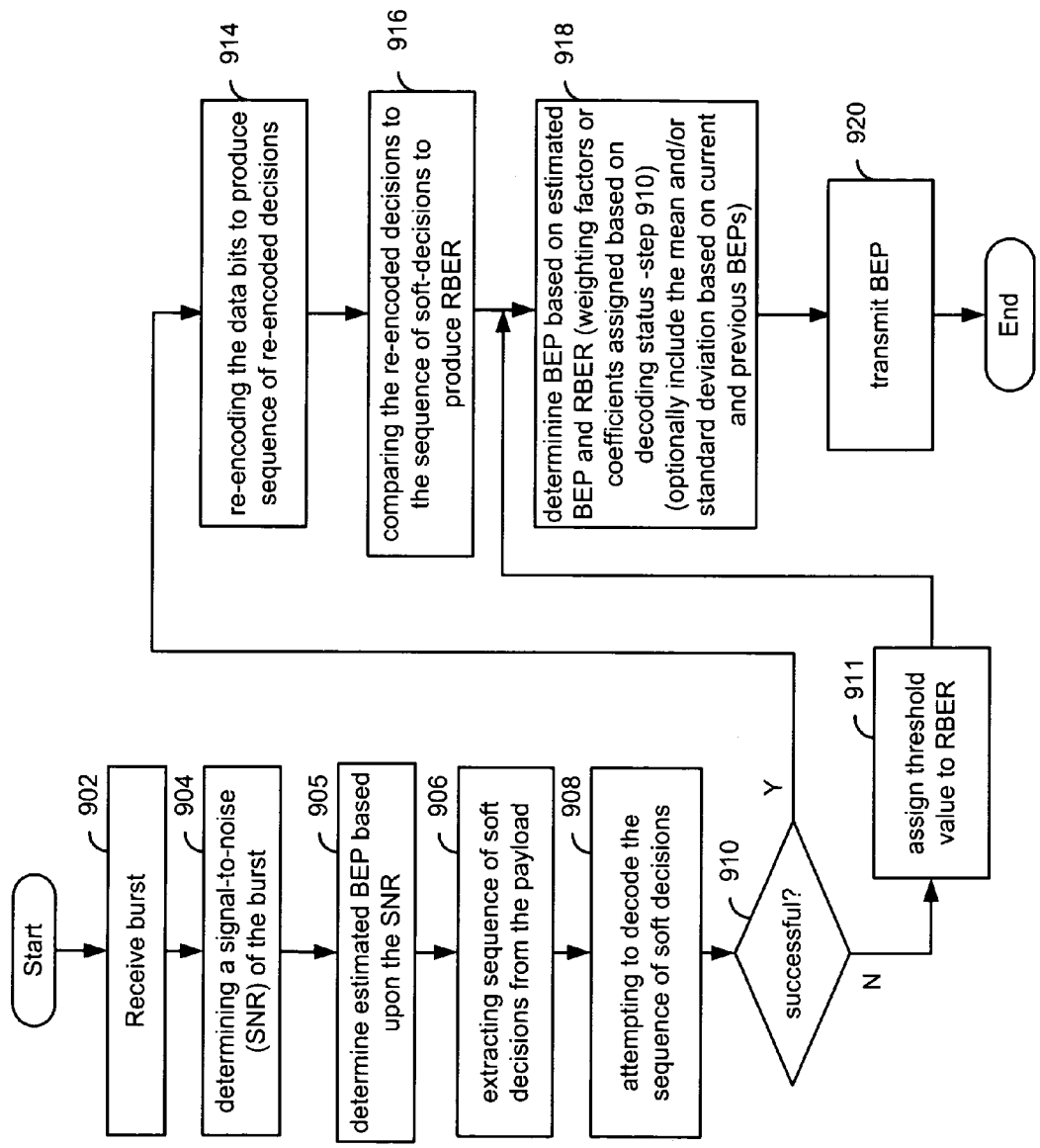

Another embodiment, as illustrated in FIG. 9B, determines the estimated BEP in step 905 with the SNR value of step 904. Additionally, this embodiment assigns a threshold value to the RBER at step 911 when the attempt to decode the plurality of soft decisions is unsuccessful (as determined at decision point 910). This allows the BEP of the RF bursts to be determined based upon both the SNR (estimated BEP of step 905) and RBER when unsuccessful decoding occurs. This combination may reduce the BEP reported to the servicing base station when a BEP based only on SNR would prove overly optimistic. Similarly, when the sequence of soft decisions decodes successfully at decision point 910, the BEP of the RF bursts may be determined based upon both the SNR (estimated BEP of step 905) and RBER the data bits, wherein different weighting values or coefficients are assigned to the SNR and RBER. These weighting values or coefficients may be based on whether or not the sequence of soft decisions decodes successfully. For example, the weighting values may weigh the SNR more heavily when the sequence of soft decisions decodes unsuccessfully. Alternatively, the weighting values may weigh the RBER more heavily when the sequence of soft decisions decodes successfully. Further, a comparison between the SNR and assigned threshold value of the RBER when the sequence of soft decisions decodes unsuccessfully may examine the relative magnitude of the estimated BEP and RBER and select the BEP to be the greater of the two. As in FIG. 9A, this process may also include the historical performance of the BEP in determining the BEP reported to the servicing base station within the downlink quality report by including the mean and/or standard deviation, or other like functions, in the determination of the BEP. In yet another embodiment to be described in FIG. 11, the BEP reported to the servicing base station may be incremented or decremented depending on whether or not the sequence of soft decisions decodes successfully.

Figure 10:
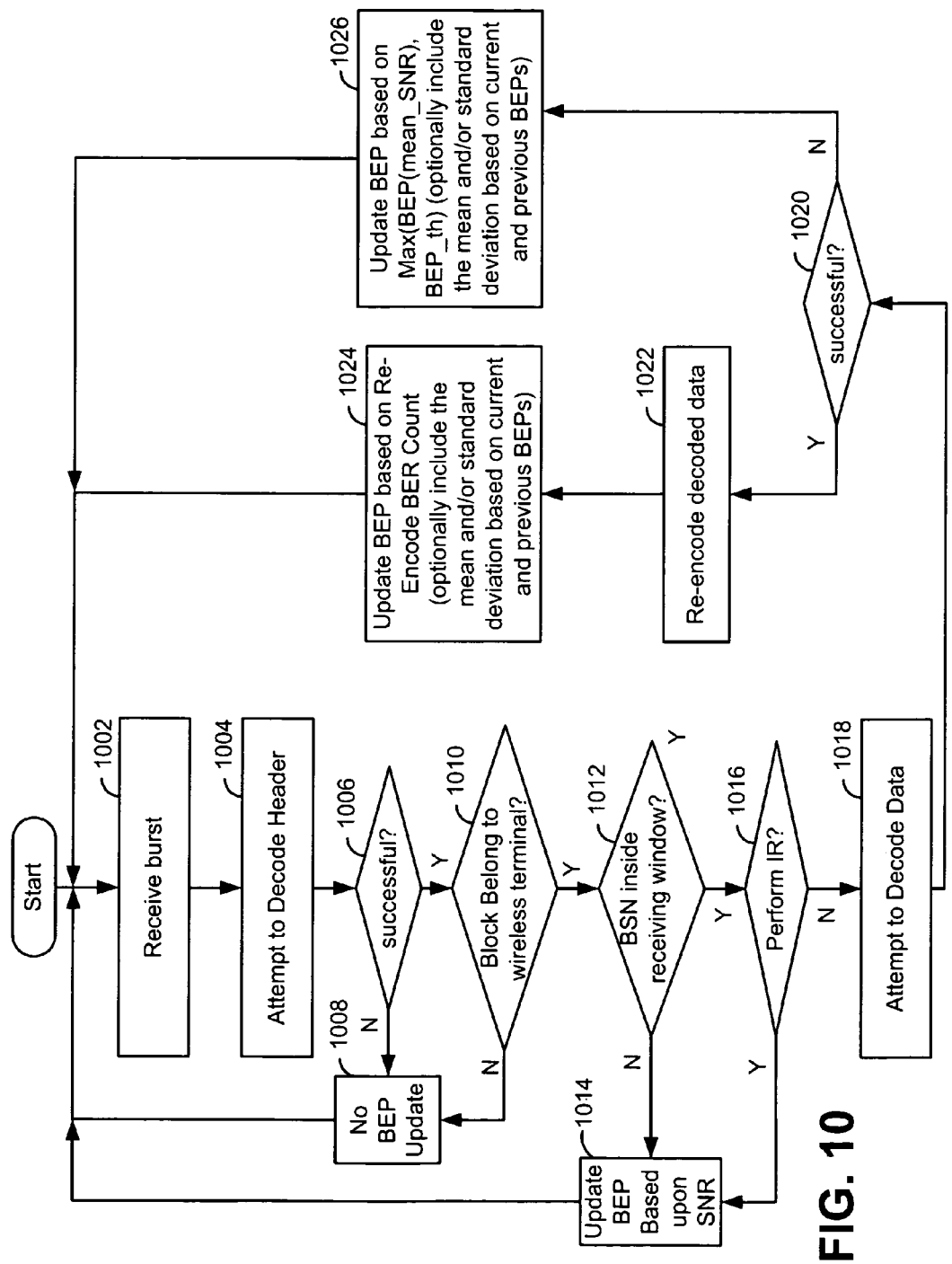
FIG. 10 is a logic diagram illustrating another embodiment of a method for operating a wireless terminal to determine a BEP of a received burst according to the present invention.

FIG. 10 is a logic diagram illustrating another embodiment of a method for operating a wireless terminal to determine a BEP of received RF bursts according to the present invention. As previously stated, Link adaptation (LA) provides a mechanism used in EDGE to adapt the channel coding schemes and modulation formats to the changing radio link conditions. LA allows the network to command the handset to change to the different modulation and coding scheme that is best for the current radio condition. To facilitate the network to do so, the handset reports a downlink quality report to the network via the servicing base station. The downlink quality report may include an estimated BEP based on the SNR of the RF bursts and the RBER of the RF bursts as well as the mean BEP (Mean_BEP) and standard deviation of the BEP (CV_BEP) of a RLC block (4 radio bursts) averaged over the reporting period and all assigned time slots per modulation type. They are derived as follows:

$$\text{MEAN\_BEP}_n = \frac{\sum_j R_n^{(j)} \cdot \text{MEAN\_BEP\_TN}_n^{(j)}}{\sum_j R_n^{(j)}}$$

-continued $$\text{CV\_BEP}_n = \frac{\sum_j R_n^{(j)} \cdot \text{CV\_BEP\_TN}_n^{(j)}}{\sum_j R_n^{(j)}}$$

Where
  n = the iteration index at reporting time
  j = the channel number.

And $R_n = (1-e) \cdot R_{n-1} + e \cdot x_n,\ R_{-1} = 0$ $$\text{MEAN\_BEP\_TN}_n = \left(1 - e \cdot \frac{x_n}{R_n}\right) \cdot \text{MEAN\_BEP\_TN}_{n-1} + e \cdot \frac{x_n}{R_n} \cdot \text{MEAN\_BEP}_{block,n} \quad \text{(Eq. 1)}$$

$$\text{CV\_BEP\_TN}_n = \left(1 - e \cdot \frac{x_n}{R_n}\right) \cdot \text{CV\_BEP\_TN}_{n-1} + e \cdot \frac{x_n}{R_n} \cdot \text{CV\_BEP}_{block,n}$$

Where:
  n is the iteration index, incremented per downlink radio block.
  $R_n$ denotes the reliability of the filtered quality parameters.
  e is the forgetting factor defined by the network.
  $x_n$ denotes the existence of quality parameters for the $n^{th}$ block, i.e. whether the radio block is intended for this MS. $x_n$ values 1 or 0, denoting the existence and absence of quality parameters, respectively.

Key challenges in LA are the algorithm used in the network for link adaptation control, and the accuracy of the $\text{MEAN\_BEP}_{block,\ n}$ and $\text{CV\_BEP}_{block,\ n}$ calculated by the handset, where $\text{MEAN\_BEP}_{block,\ n}$ is the BEP value averaged over at least one given RLC block and $\text{CV\_BEP}_{block,\ n}$ is the corresponding standard deviation.

There are several ways to obtain $\text{MEAN\_BEP}_{block,\ n}$. For example, the $\text{MEAN\_BEP}_{block,\ n}$ can be derived based on: (1) signal-to-noise ratio (SNR); (2) re-encoding correctly decoded data; or (3) the training sequence. SNR-based BEP requires robust SNR-to-BEP mapping table that covers all types of propagation environments. SNR based approximations often overestimate system performance. This over estimation of system performance can result in optimistic BEPs being used to make LA decisions. LA decisions based upon optimistic BEP can result in lost communications between the wireless terminal and the servicing base station. Furthermore, extensive computer simulations are therefore needed to generate this mapping table.

RBER count provides a better measurement for the current link quality regardless of the radio propagation environments. Thus re-encoding based BEP can better reflect the link quality, however, this value is available only if the data block is decoded correctly. Training sequence based BEP calculation can be easily obtained but it does not provide enough samples (26 for GMSK, 78 for 8PSK) for BEP averaging. However, one bad RBER count could severely impact the selected MCS. Therefore historical factors such as the mean and standard deviation provide improved ways of establishing thresholds for LA decisions. The present invention provides better results by combining methods 1 through 3.

One particular embodiment uses a joint SNR and re-encoding based BEP algorithm. This allows the wireless terminal to report the BEP regardless of the data decoding status. The estimated RF bursts SNR may be derived using the training sequence. The estimated RF bursts SNR and corresponding modulation type, determined as described in FIG. 7, are then placed in shared memory for the ARM to process the final BEP report. SNR-BEP tables, derived from AWGN channel for 8PSK and GMSK together with pre-defined thresholds, and RBER, constitute the basis of this algorithm. The pre-defined threshold is denoted as BEP_th. This threshold depends on the MCS mode and is determined by the error-correction capability of the given MCS mode.

Referring now to the operations of FIG. 10, a burst is received (step 1002). The burst will typically be one of four portions of an RLC block and typically carries a training sequence (mid amble), a header, a data block, and a tail/trailer. Upon receipt of the RF burst, an attempt is made to decode the header (step 1004). Decoding the header allows the coding scheme to be readily identified. This information is coupled with knowledge to the modulation format to determine the MCS of the RF bursts. If the decode is not successful (as determined at step 1006), no BEP update is performed (step 1008) and operation returns to step 1002 wherein another burst is awaited. If the header decode is successful (as determined at step 1006), operation proceeds to step 1010 where the wireless terminal determines whether the data block carried in the bursts is intended for the wireless terminal. If the data block is not intended for the wireless terminal, the operation proceeds to step 1008 and no BEP update/calculation occurs. This prevents unnecessary BEP calculations and potential LA decisions being based on communications not intended for the wireless terminal.

If the data block carried in the bursts does belong to the wireless terminal (as determined at step 1010), the wireless terminal next determines whether the Block Sequence Number (BSN) of the data block is within a receiving window under consideration (step 1012). If not, the BEP is updated based upon the SNR of the block (at step 1014) and operation proceeds from step 1014 to step 1002 where another burst is awaited. If the BSN is inside the receiving window (as determined at step 1012) it is next determined whether Incremental Redundancy (IR) is to be performed upon the received block (step 1016). If IR is to be performed, operation proceeds to step 1014. If not, the wireless terminal attempts to decode the received data block (step 1018).

If the decode attempt of step 1020 is successful, as determined at step 1020, the decoded data is re-encoded in step 1022 to produce a RBER based upon the re-encoded data, and the BEP is updated based upon the RBER count in step 1024. If the decoding attempt is not successful (as determined at step 1020), operation proceeds to step 1026 where the BEP is updated based upon the maximum of the estimated BEP based on SNR, or BEP(mean_SNR), and the pre-defined threshold, BEP_th. From both steps 1024 and 1026 operation returns to step 1002. The BEP update may further include the historical performance of the BEP in determining the BEP update to the servicing base station by including the mean and/or standard deviation of the BEP update in the determination of the BEP.

In the operation of FIG. 10, therefore, SNR is typically calculated with the training sequence of the bursts to map to an estimated BEP and will be used for BEP calculation whenever the RBER is not available. The training sequence may also be used to produce an RBER based on a smaller sample set than using the data portion would provide. Generally, the SNR provides a reasonable link quality measure for channels free of inter-symbol interference. For channel with inter-symbol interference, SNR alone is not sufficient to measure the quality of the link. Instead, RBER count is a better quality measure. When data decoding fails, the RBER cannot be obtained. In this case, SNR-based BEP calculation will be used with the additional fact that data decoding has failed. This information can help better quantify the downlink quality in combination with the SNR. When data decoding fails, the number of errors in the received block has to exceed some threshold. Therefore, the RBER can be assumed to reach this threshold. This threshold, for a given MCS mode, is related to the error correction capability of the mode and can be obtained via measurements or simulations. The threshold needs to be carefully selected and tested.

Figure 11:
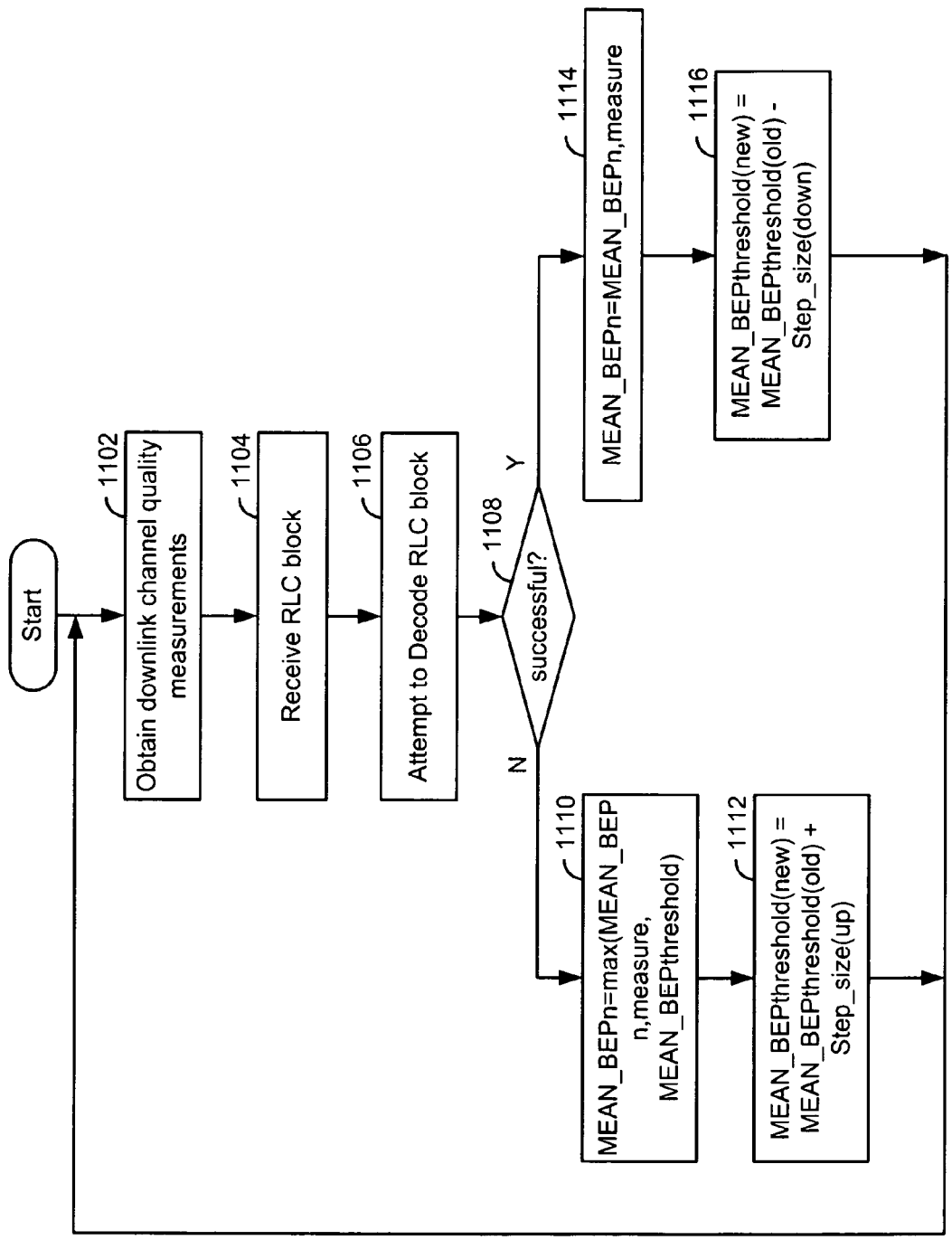
FIG. 11 is a logic diagram illustrating an embodiment of the present invention in determining reported channel quality based upon decoding results.

FIG. 11 is a logic diagram illustrating an embodiment of the present invention in determining reported downlink channel quality based upon decoding results. FIG. 11 illustrates an adaptive channel quality estimation algorithm within the context of an EDGE system (Enhanced Data rate for GSM Evolution). However, the teachings illustrated in FIG. 11 may be applied to other systems equally well. In an EDGE system, MEAN_BEP$_{block,n}$ is defined as the BEP value averaged over 4 radio bursts for a given RLC block and CV_BEP$_{block,n}$ is the corresponding standard deviation. There are several ways to obtain MEAN_BEP$_{block,n}$ in EDGE system. It can be derived based on the (1) signal-to-noise ratio (SNR), (2) re-encoding correctly decoded data, and (3) using training sequence.

Whether the LA can be effective highly depends on the accuracy of the channel downlink quality reports from the wireless terminal and the LA threshold adjustment from the network. However, measurement errors are unavoidable from wireless terminals that experience a fast changing wireless condition. Moreover, the LA threshold on the network is usually adjusted based upon one (or a very few) available test wireless terminals. As a result, these thresholds may not be appropriate for other wireless terminals, leading to unsuitable transmission formats being used for the wireless terminal and thus lower the data throughput. In the worst case, this will lead to data transfer stall, which is more prominent in low receive signal strength conditions (RSSI). To address this issue, the operations of FIG. 11 illustrate an adaptive channel quality estimation algorithm for the wireless communication systems that employ link adaptation. BEP is used in FIG. 11 as an example of the channel quality measures to describe the adaptive channel quality estimation algorithm.

Operation commences in obtaining the downlink channel quality measurements (e.g. MEAN_BEP and CV_BEP) using any available algorithm (step 1102). Next, an RLC block is received (step 1104), decoding is attempted (step 1106), and it is determined whether the decoding attempt was successful at decision point 1108.

For each RLC block with a decoding error, two steps need to be performed. In a first step 1110, MEAN_BEP$_n$=max (MEAN_BEP$_{n,measure}$, MEAN_BEP$_{threshold}$), where MEAN_BEP$_{n,measure}$ is the measured MEAN_BEP for block n, and MEAN_BEP$_{threshold}$ is the BEP threshold for the given transmission format, which is determined by its error correction capability. Further the MEAN_BEP$_{threshold}$ is increased accordingly for each such decoding error, by setting MEAN_BEP$_{threshold}$(new)=MEAN_BEP$_{threshold}$ (old)+Step_size(up) (step 1112). In such case, Step_size(up) (>=0) is the increment of MEAN_BEP threshold. This value can be obtained via simulation or experiment.

For each RLC block that is decoded successfully, two steps need to be performed. In a first step 1114, set MEAN_BEP$_n$=MEAN_BEP$_{n,measure}$. In a second step, the MEAN_BEP$_{threshold}$ is set accordingly for each success by setting MEAN_BEP$_{threshold}$(new)=MEAN_BEP$_{threshold}$ (old)−Step_size(down) (step 1116). At step 1116, Step_size (down) (>=0) is the decrement of MEAN_BEP threshold. Again this value can be obtained via simulation or experiment and it is usually smaller than Step_size(up) to maintain the stability of the system. From each of steps 1112 and 1116 operation returns to step 1102.

The advantage of the operations illustrated in FIG. 11 is that the reported channel quality (e.g. MEAN_BEP) is directly related to the historical decoding success rate on the downlink, which is normally represented by block error rate (BLER). As a result, if the wireless terminal experiences more decoding errors on the downlink, the corresponding channel quality will be adjusted downward, which facilitates the network to use more robust transmission format. This significantly reduces the transmission problem due to measurement errors or un-matching link adaptation thresholds. This feature is especially useful when the wireless terminal operates in low RSSI conditions or experiences some unpredictable fading conditions.

Figure 12:
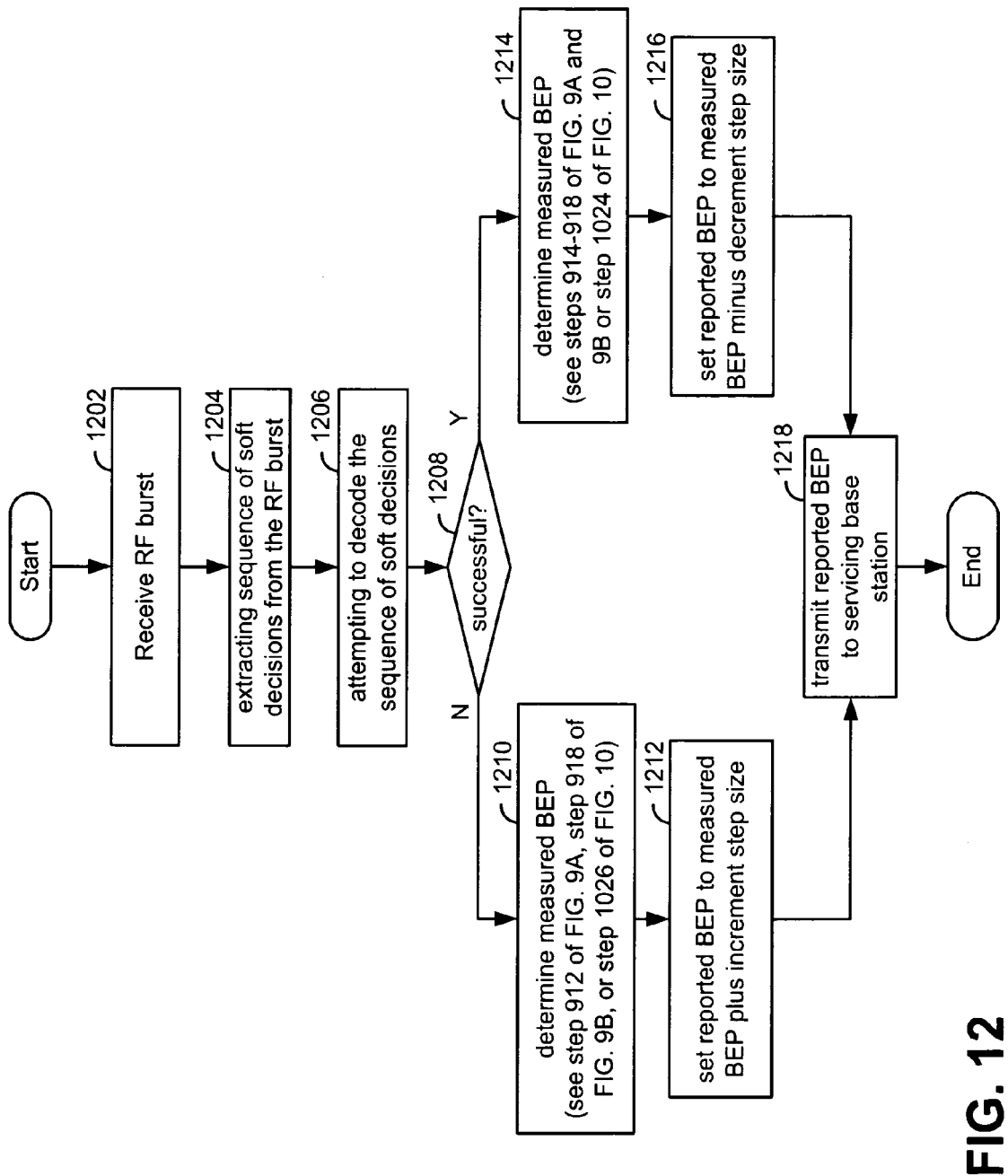
FIG. 12 is a logic diagram illustrating an embodiment of the present invention in determining reported channel quality based upon decoding results.

FIG. 12 is a logic diagram illustrating a method for operating a wireless terminal to determine a reported BEP within a downlink quality report associated with a received burst. The method commences with receiving the RF burst in step 1202. Continuing with step 1204, a sequence of soft decisions is extracted from the RF bursts. This sequence may correspond to the training sequence or data, wherein the greater number of samples available within the data portion would yield more accurate results than those derived from the smaller sample set of the training sequence. An attempt to decode the sequence of soft decisions is made at step 1206. When the attempt to decode the plurality of soft decisions is unsuccessful (as determined at decision point 1208), the measured BEP may be determined based upon the SNR (estimated BEP) as described in step 912 of FIG. 9A, based upon the SNR (estimated BEP) and RBER as described in step 918 of FIG. 9B, or based upon the maximum of the estimated BEP based on SNR and the pre-defined threshold as described in step 1026 of FIG. 10. The measured BEP may further include the historical performance of the measured BEP by including the mean and/or standard deviation of the measured BEP. Then the measured BEP as determined in step 1210 is incremented by an increment step size in step 1212 to yield a reported BEP value, which is transmitted to the servicing base station in step 1218.

Figure 13:
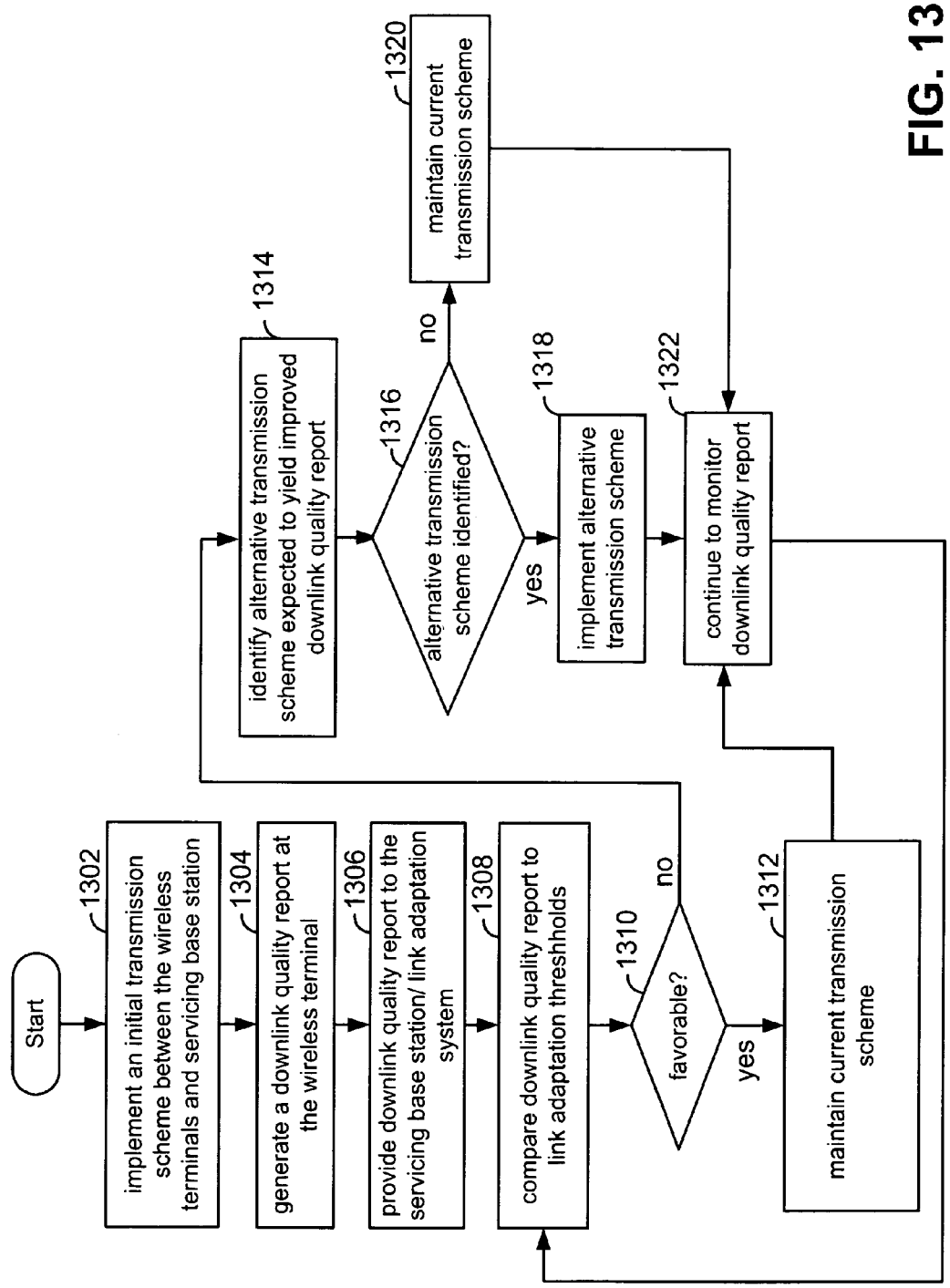
FIG. 13 is a logic diagram illustrating an embodiment of the present invention that implements link adaptation decisions based on a downlink quality report.

Returning to decision point 1208, when the attempt to decode the plurality of soft decisions is successful the measured BEP may be determined based upon the RBER only as described in steps 914 through 918 of FIG. 9A and step 1024 of FIG. 10, or the RBER and SNR (estimated BEP) as described in step 914 through 819 of FIG. 9B. The measured BEP may further include the historical performance of the measured BEP by including the mean and/or standard deviation of the measured BEP. Then the measured BEP as determined in step 1214 is decremented by a decrement step size in step 1216 to yield a reported BEP value, which is then transmitted to the servicing base station in step 1218. FIG. 13 is a logic diagram illustrating the implementation of LA decision within a wireless communication system, such as a cellular network. The method commences in step 1302 with the implementation of an initial transmission scheme (MCS) between the wireless terminals and servicing base stations. Continuing with step 1304, a downlink quality report is generated by the wireless terminals and provided to the servicing base station. This downlink quality report is based on the reported BEP. Various methods exist for determining the reported BEP, including those described with FIGS. 9A, 9B, 10, 11, and 12. If the downlink quality report compares favorably to the link adaptation thresholds, the current transmission scheme is maintained in Step 1312. Monitoring of the downlink quality report then continues in step 1322. The LA thresholds establish quality levels when it becomes necessary to change the transmission scheme. Other additional criteria may be used to change the transmission scheme that relate to network loading, call priority or other factors known to those skilled in the art. The monitored downlink quality report is then compared to the LA thresholds for individual wireless terminals as the process returns to step 1308. Typically one LA threshold has been used for all the wireless terminals. Not only does this embodiment allow for adjusting LA thresholds, individual LA thresholds associated with individual wireless terminals may be independently adjusted. This adjustment may be downwards when the comparison between the downlink quality report and the LA thresholds is unfavorable. Additionally, when the comparison is unfavorable, the link adaptation system may attempt to identify an alternative transmission scheme that is expected to yield an improved downlink quality report in step 1314. This improved downlink quality report corresponds to an improved quality of the communications experienced by the end users. If an alternate transmission scheme is identified at decision point 1316, then the alternate transmission scheme is implemented at Step 1318. Monitoring of future downlink quality reports continues in Step 1322. However, if an alternate transmission scheme is not identified at decision point 1316, it is necessary to maintain the current transmission scheme at step 1320. Again, monitoring of the downlink quality report continues at Step 1322 with the process returning to step 1308.

FIG. 14 is a logic diagram illustrating another method for making and implementing link adaptation decisions within a wireless communication system. This implementation allows the LA thresholds to be adjusted for individual wireless terminals. At step 1402, an initial transmission scheme is implemented between wireless terminals and servicing base stations. The wireless terminals generate downlink quality reports at step 1404, which in turn are provided to the servicing base station's and their operable coupled link adaptation systems in step 1406. This downlink quality report is compared to the LA thresholds in step 1408. When the downlink quality report compares favorably to the link adaptation threshold at decision point 1410, the current transmission scheme is maintained and the processes is directed to step 1412. However, if the downlink quality report compares unfavorably with the link adaptation threshold at decision point 1410, an alternative transmission scheme is identified at step 1414 wherein the alternative transmission scheme is expected to yield an improved downlink quality report. If such an alternative transmission scheme is identified, the alternative transmission scheme is then implemented in step 1416. The process continues to monitor the downlink quality report in step 1418 whether the current transmission scheme was maintained or an alternate transmission scheme was implemented as directed from step 1412 or step 1416, respectively. Further, a determination is made as to whether the data from the RF communications decoded successfully in step 1420. If the communications decoded successfully as determined in decision point 1422, the link adaptation threshold may be decremented by a decrement step size in step 1424 for future comparisons as the process continues to step 1408. Otherwise, the link adaptation thresholds may be incremented by an increment step size at step 1426 for use in future comparisons within Step 1408. By incrementing or decrementing the link adaptation thresholds, the possibility of spurious LA decisions may be reduced to avoid unnecessary LA changes. This helps maintain a successful communication transmission scheme when the communications are decoding properly. Similarly if the data is decoding improperly, incrementing the LA thresholds helps to force an unfavorable comparison between the downlink quality report and the link adaptation threshold. This unfavorable comparison at decision point 1410 is necessary to identify and implement an alternative transmission scheme as described in steps 1414 and 1416.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method to select a transmission scheme for a radio frequency (RF) burst between a servicing base station and individual wireless terminals in a cellular wireless communication system, the method comprising:
    implementing a first transmission scheme between the servicing base station and the wireless terminal;
    receiving a first downlink quality report corresponding to the first transmission scheme at the servicing base station from the wireless terminal, wherein the downlink quality report comprises:
        a bit error probability (BEP) based on a re-encoded bit error (RBER) of data within the RF bursts and an estimated BEP derived from a signal to noise ratio (SNR) of the RF burst;
        a block error rate (BLER) of data within the RF bursts, wherein the BLER is derived from a bitmap reported by the wireless terminal;
        a mean BLER determined by averaging together the BLER of each RF burst within a data frame; and
        a standard deviation of the BLER within the data frame;
    comparing the first downlink quality report corresponding to the first transmission scheme to at least one link adaptation threshold for individual wireless terminals;
    implementing an alternative transmission scheme between the servicing base station and the wireless terminal when the first downlink quality report compares unfavorably to the at least one link adaptation threshold, and wherein the alternative transmission scheme is expected to result in an expected quality report being improved over the first downlink quality report; and
    adjusting the at least one link adaptation threshold at the servicing base station for individual wireless terminals based on the downlink quality report.

2. The method of claim 1, wherein the wireless terminal determines the BEP based on:
    an estimated BEP derived from the SNR of the RF burst when the data within the RF burst decoded unfavorably; and
    the estimated BEP, the RBER, and/or BLER when the data within the RF burst decoded favorably.

3. The method of claim 2, wherein the SNR is derived from a training sequence within the RF burst.

4. The method of claim 2, wherein the SNR maps to the estimated BEP based on a modulation format of the RF bursts.

5. The method of claim 4, wherein the modulation format of the RF burst is GMSK or 8PSK.

6. The method of claim 1, wherein decoding unfavorably corresponds to the data within the RF burst having a measured bit error rate (BER) exceeding a predetermined threshold value, and wherein the estimated BEP considers the measured BER at the predetermined threshold value or greater.

7. The method of claim 6, wherein the predetermined threshold value is based on a Coding Scheme of the RF burst.

8. The method of claim 1, wherein adjusting the at least one link adaptation threshold at the servicing base station for individual wireless terminals based on the downlink quality report further comprises:
    incrementing the at least one link adaptation threshold when an unfavorable downlink quality report is received at the servicing base station; and
    decrementing the at least one link adaptation threshold when a favorable downlink quality report is received at the servicing base station.

9. The method of claim 8, wherein:
    an unfavorable downlink quality report comprises an unfavorable comparison between the BLER and a BLER threshold; and
    a favorable downlink quality report comprises a favorable comparison between the BLER and the BLER threshold.

10. The method of claim 1, further comprising dynamically selecting a transmission scheme for a radio frequency (RF) burst between a servicing base station and a wireless terminal in a cellular wireless communication system using the downlink quality report of the wireless terminal.

11. A cellular wireless communication system that comprises:
at least one servicing base station operable to select a transmission scheme for a radio frequency (RF) burst between the at least one servicing base station and at least one wireless terminal;
at least one wireless terminal operable to transmit a downlink quality report on the transmission scheme, wherein the downlink quality report comprises:
a bit error probability (BEP) based on a re-encoded bit error (RBER) of data within the RF burst and an estimated BEP derived from a signal to noise ratio (SNR) of the RF burst;
a block error rate (BLER) of data within the RF bursts, wherein the BLER is derived from a bitmap reported by the wireless terminal;
a mean BLER determined by averaging together the BLER of each RF burst within a data frame; and
a standard deviation of the BLER within the data frame
a link adaptation system operably coupled to the at least one servicing base station operable to:
compare the downlink quality report to at least one link adaptation threshold of the at least one wireless terminal;
implement an alternative transmission scheme between the at least one servicing base station and the at least one wireless terminal when the downlink quality report compares unfavorably to the at least one link adaptation threshold, and wherein the alternative transmission scheme is expected to result in an expected downlink quality report being improved over the downlink quality report; and
adjust the at least one link adaptation threshold at the servicing base station for individual wireless terminals based on the downlink quality report.

12. The cellular wireless communication system of claim 11, wherein the at least one wireless terminal determines the BEP based on:
an estimated BEP derived from the SNR of the RF burst when the data within the RF burst decoded unfavorably; and
the estimated BEP, the RBER, and or BLER when the data within the RF burst decoded favorably.

13. The cellular wireless communication system of claim 12, wherein the SNR is derived from a training sequence within the RF burst.

14. The cellular wireless communication system of claim 13, wherein the SNR maps to the estimated BEP based on a modulation format of the RF burst.

15. The cellular wireless communication system of claim 14, wherein the modulation format of the RF burst is GMSK or 8PSK.

16. The cellular wireless communication system of claim 11, wherein decoding unfavorably corresponds to the data within the RF burst having a measured bit error rate (BER) exceeding a predetermined threshold value, and wherein the estimated BEP considers the measured BER at the predetermined threshold value or greater.

17. The cellular wireless communication system of claim 16, wherein the predetermined threshold value is based on a Coding Scheme of the RF burst.

18. The cellular wireless communication system of claim 11, wherein:
the at least one link adaptation threshold is incremented when an unfavorable downlink quality report is received at the servicing base station; and
the at least one link adaptation threshold is decremented when a favorable downlink quality report is received at the servicing base station.

19. The cellular wireless communication system of claim 11, wherein the wireless terminal operates according to the GSM standard.

20. A method to dynamically select a transmission scheme for a radio frequency (RF) burst between a servicing base station and individual wireless terminals in a cellular wireless communication system, the method comprising:
implementing a first transmission scheme between the servicing base station and the wireless terminal;
receiving a first downlink quality report corresponding to the first transmission scheme at the servicing base station from the wireless terminal, wherein the downlink quality report comprises:
a block error rate (BLER) of data within the RF bursts;
a mean bit error probability (BEP) determined by averaging a BEP of each RF burst within a data frame; and
a standard deviation of the BEP within the data frame, wherein the BEP is based on an estimated BEP derived from a signal to noise ratio (SNR) of the RF burst and a re-encoded bit error (RBER), wherein:
the estimated BEP is weighed more heavily when data within RF burst is decoded unfavorably;
the RBER corresponds to a bit error rate (BER) exceeding a threshold value when data within RF burst is decoded unfavorably; and
the RBER is weighed more heavily when data within RF burst is decoded favorably/,
comparing the first downlink quality report corresponding to the first transmission scheme to at least one link adaptation threshold; and
implementing an alternative transmission scheme between the servicing base station and the wireless terminal when the downlink quality report compares unfavorably to the at least one link adaptation threshold, and wherein alternative transmission scheme is expected to result in an expected quality report being improved over the first downlink quality report; and
adjusting the at least one link adaptation threshold at the servicing base station for individual wireless terminals based on the downlink quality report.

21. The method of claim 20, wherein the SNR is derived from a training sequence within the RF burst.

22. The method of claim 21, wherein the transmission scheme comprises:
a coding scheme; and
a modulation format.

23. The method of claim 22, wherein the SNR maps to the estimated BEP based on a modulation format of the RF burst.

24. The method of claim 23, wherein the modulation format of the RF burst is GMSK or 8PSK.

25. The method of claim 20, wherein:
the at least one link adaptation threshold is incremented when an unfavorable downlink quality report is received at the servicing base station; and
the at least one link adaptation threshold is decremented when a favorable downlink quality report is received at the servicing base station.

26. The method of claim 20, wherein the wireless terminal operates according to the GSM standard.

* * * * *

UNITED STATES PATENT AND TRADEMARK OFFICE
CERTIFICATE OF CORRECTION

PATENT NO.        : 7,107,013 B2  
APPLICATION NO.   : 10/828043  
DATED             : September 12, 2006  
INVENTOR(S)       : Xiaoxin Qui Page 1 of 1

It is certified that error appears in the above-identified patent and that said Letters Patent is hereby corrected as shown below:

Column 22, line 32, in Claim 20: replace "favorably/," with --favorably,--

Signed and Sealed this

Twelfth Day of August, 2008

JON W. DUDAS  
*Director of the United States Patent and Trademark Office*